United States Patent
Yusu et al.

(10) Patent No.: US 6,174,597 B1
(45) Date of Patent: Jan. 16, 2001

(54) MAGNETIC RECORDING APPARATUS

(75) Inventors: Keiichiro Yusu, Kawasaki; Katsutaro Ichihara, Yokohama; Hideo Ogiwara, Chigasaki; Akira Kikitsu, Yokohama; Futoshi Nakamura, Ichikawa, all of (JP)

(73) Assignee: Kabushiki Kaisha Toshiba, Kawasaki (JP)

( * ) Notice: Under 35 U.S.C. 154(b), the term of this patent shall be extended for 0 days.

(21) Appl. No.: 08/900,581

(22) Filed: Jul. 25, 1997

(30) Foreign Application Priority Data

| Jul. 26, 1996 | (JP) | 8-197587 |
| Aug. 29, 1996 | (JP) | 8-228564 |
| Sep. 2, 1996 | (JP) | 8-232080 |
| Sep. 4, 1996 | (JP) | 8-234269 |

(51) Int. Cl.$^7$ ....................................... G11B 5/66
(52) U.S. Cl. ............... 428/332; 428/336; 428/694 B; 428/694 BA; 428/900
(58) Field of Search ............... 428/694 B, 694 BA, 428/900, 336, 332

(56) References Cited

U.S. PATENT DOCUMENTS

| 5,480,694 | * | 1/1996 | Daimon et al. | 428/64.1 |
| 5,626,941 | * | 5/1997 | Ouano | 428/141 |
| 5,679,473 | * | 10/1997 | Murayama et al. | 428/694 T |
| 5,763,085 | * | 6/1998 | Atarashi et al. | 428/403 |
| 5,768,075 | * | 6/1998 | Bar-Gadda | 360/135 |
| 5,774,783 | * | 6/1998 | Kaitsu et al. | 428/546 |

FOREIGN PATENT DOCUMENTS

| 0452876 A2 | 10/1991 | (EP) . |
| 0797192 A1 | 9/1997 | (EP) . |
| 7-98835 | 4/1995 | (JP) . |
| 7-311929 | 11/1995 | (JP) . |
| 08255342 | 10/1996 | (JP) . |

* cited by examiner

*Primary Examiner*—Leszek Kiliman
(74) *Attorney, Agent, or Firm*—Finnegan, Henderson, Farabow, Garrett, & Dunner L.L.P.

(57) ABSTRACT

A magnetic recording apparatus includes a magnetic recording medium including a substrate and a magnetic recording layer formed on the substrate and having a structure in which magnetic grains are dispersed in a nonmagnetic matrix, a means for recording magnetic information on the magnetic recording medium, and a means for reproducing magnetic information from the magnetic recording medium wherein the magnetic grains are separated from the substrate by a part of the matrix and form a substantially single layer parallel to the main surface of the substrate.

23 Claims, 11 Drawing Sheets

MAGNETIC RECORDING APPARATUS

BACKGROUND OF THE INVENTION

The present invention relates to a magnetic recording apparatus using a dispersed magnetic recording medium.

In recent years, the recording information amount has increased along with the improvement in performance of computers, digitization of image and audio information, and the improvement in image quality. With the spread of small-size computers, storage devices have been downsized. As a result, a higher recording/reproduction ability is required of such devices particularly in the use of hard disks.

Realization of a high recording density of a magnetic recording medium such as a hard disk requires a magnetic recording layer having a large coercive force. For example, thin magnetic films formed from a Co-based alloy such as CoNiCr and CoCrM (M=Ta, Pt) have large coercive forces due to large magnetocrystalline anisotropy. These thin magnetic films, however, have strong medium noise. The medium noise is caused by a strong magnetic interaction which acts between crystal grains when the thin magnetic film forms a stable magnetic domain. As a reproduction head, a magnetoresistive head (MR head) and a giant magnetoresistive head (GMR head) such as a spin valve have been used because of high sensitivities. Although the system noise is reduced by using such a high-sensitivity reproduction head, the influence of the medium noise of the magnetic recording medium becomes more prominent. Therefore, reducing the medium noise becomes more and more important.

To reduce the medium noise, the use of a dispersed magnetic recording medium in which magnetic grains are dispersed in a nonmagnetic matrix is examined. In the dispersed magnetic recording medium, a reduction in medium noise is expected because the exchange interaction between magnetic grains is reduced by the nonmagnetic matrix present between the magnetic grains. However, in the dispersed magnetic recording medium, a yet further reduction in medium noise is demanded, and a further improvement is required in this respect.

BRIEF SUMMARY OF THE INVENTION

It is an object of the present invention to provide a low-noise magnetic recording apparatus having a dispersed magnetic recording medium.

According to the present invention, there is provided a magnetic recording apparatus comprising a magnetic recording medium comprising a substrate and a magnetic recording layer formed on the substrate and having a structure in which magnetic grains are dispersed in a nonmagnetic matrix, means for recording magnetic information on the magnetic recording medium, and means for reproducing magnetic information from the magnetic recording medium wherein the magnetic grains are separated from the substrate by a part of the matrix and form a substantially single layer parallel to a main surface of the substrate.

According to the present invention, there is provided another magnetic recording apparatus comprising a magnetic recording medium comprising a substrate and a magnetic recording layer formed on the substrate and having a structure in which magnetic grains are dispersed in a nonmagnetic matrix, means for recording magnetic information on the magnetic recording medium, and means for reproducing magnetic information from the magnetic recording medium wherein the magnetic grains have a flat shape along a film surface, and an exchange interaction between adjacent magnetic grains in an in-plane direction is smaller than that in a perpendicular direction.

According to the present invention, there is provided still another magnetic recording apparatus comprising a magnetic recording medium comprising a substrate and a magnetic recording layer formed on the substrate and having a structure in which magnetic grains are dispersed in a nonmagnetic matrix, means for recording magnetic information on the magnetic recording medium, and means for reproducing magnetic information from the magnetic recording medium wherein the magnetic grains include island-like magnetic grains, and an average value of angles defined by side surfaces of the island-like magnetic grains and a surface of the substrate is not more than 75°.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The present invention will be described in detail below.

Figure 1:
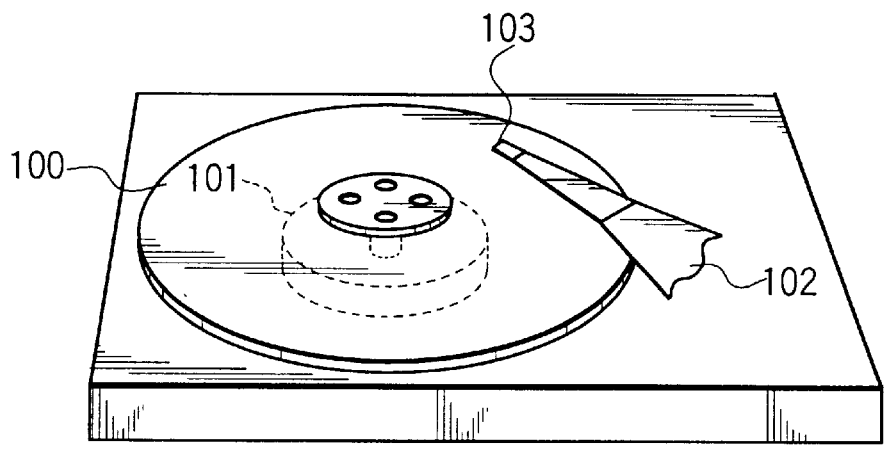
FIG. 1 is a schematic view showing a magnetic recording apparatus according to the present invention.

FIG. 1 schematically shows a magnetic recording apparatus according to the present invention, i.e., a so-called hard disk drive. A magnetic disk 100 is rotatably supported by a spindle motor 101. As a recording/reproduction means, a magnetic head 103 is fixed to the distal end of an arm 102. A preferable reproduction magnetic head is the one including a high-sensitivity magnetoresistive element. Recording/reproduction is performed at a predetermined position on the magnetic disk 100 by rotating the magnetic disk 100, and moving the arm 102 and the magnetic head 103 in the radial direction of the magnetic disk 100. In accordance with applications, the shape of the magnetic recording medium can be variously changed into a tapered shape, a drum shape, and the like, in addition to a disk shape.

The magnetic recording medium in the present invention has a structure in which a magnetic recording layer is formed on a substrate. The substrate to be used can be formed from various materials such as glass, ceramics, metals, and resins. A substrate having an underlayer formed from Cr or the like on its surface may be used, as needed. The thickness of the magnetic recording layer is 40 nm or less, and preferably 20 nm or less for ultra-high-density recording.

The magnetic recording layer constituting the magnetic recording medium of the present invention has a structure in which magnetic grains are dispersed in a nonmagnetic matrix. This magnetic recording layer can be considered as a composite material of the magnetic grains and the nonmagnetic matrix. According to the definition of the connectivity of the composite material, this magnetic recording layer can be expressed as so-called "3-1 connection" or "3-2 connection" because the nonmagnetic matrix spreads three-dimensionally, and the magnetic grains are in a two-dimensional or one-dimensional connected state.

In the present invention, the material constituting the magnetic grain is preferably an alloy containing a metal selected from the group consisting of Co, Pt, Sm, Fe, Ni, Cr, Mn, Bi, and Al. These alloys may be added with an additive for improving magnetic characteristics, e.g., an element such as Cr, Nb, V, Ta, Ti, W, Hf, In, Si, or B, or a compound of these elements and at least one element selected from oxygen, nitrogen, carbon, and hydrogen. A desirable magnetic grain is the one having large saturation magnetization Is and large magnetic anisotropy. As the magnetic grain, a Co-based alloy such as CoPt, SmCo, CoCr, CoPtCr, CoCrPtTa, CoTaCr, CoTaPt, CoNiTa, or CoPt is particularly preferable. An Mn-based alloy such as MnBi or MnAl is also preferable.

In the present invention, the nonmagnetic matrix has a network shape continuous in the perpendicular and in-plane directions, and has a function of disrupting the magnetic interaction between the grains. To suppress magnetic coupling between the grains, the nonmagnetic matrix is preferably formed from an insulator or a high-resistance material even with slight conductivity. As the nonmagnetic matrix, an oxide, a nitride, and a carbide expressed by a general formula M—G can be used. In this case, M is at least one material selected from the group consisting of Si, Al, Zr, Ti, Ta, Sn, In, Ge, and B, and G is at least one material selected from the group consisting of oxygen, nitrogen, and carbon. More specifically, preferable materials are Si—O, Al—O, Zr—O, Ta—O, Sn—O, In—O, Ge—O, Ti—O, Si—N, Al—N, Zr—N, Ti—N, B—N, Si—C, Ti—C, B—C, SiAl—ON, Si—ON, AlTi—OC, InSn—O, and the like. An allotropy of carbon, e.g., diamond, amorphous carbon, and diamond-like carbon may be used. A single substance of boron or germanium may be used. An organic material such as polytetrafluoroetylene may also be used.

The nonmagnetic matrix has a function of enhancing the mechanical strength of the entire magnetic recording layer. In terms of the hardness as a measure of the mechanical strength, as the hardness is higher, damage to the magnetic recording layer upon contact with the magnetic head is expected to be smaller. From this viewpoint, the nonmagnetic matrix is desirably formed from a material having a high hardness in bulk. In general, a material hard in bulk maintains a sufficient hardness even if it is formed into a thin film. The hardness of the bulk material constituting the nonmagnetic matrix is preferably equal to or higher than the Vickers hardness of bulk $SiO_2$, i.e., 2 GPa. To increase the hardness and wear resistance of the nonmagnetic matrix, another nonmagnetic element may be added to the matrix. In this case, the added element may be contained as a solid solution in the matrix, may be phase-separated from the matrix, or may exist as fine grains in the matrix.

An interface phase may exist between the magnetic grain and the nonmagnetic matrix. This interface phase has a function of efficiently connecting the magnetic grain and the nonmagnetic matrix, and preventing mutual diffusion of the constituent elements. The interface phase may be mainly formed from a constituent element of at least one of the magnetic grain and the nonmagnetic matrix. Such an interface phase is preferable because it strongly connects the magnetic grain with the nonmagnetic matrix. The interface phase may hardly contain the constituent elements of the magnetic grain and the nonmagnetic matrix. Such an interface phase is preferable because it completely separates the magnetic grain from the nonmagnetic grain in a magnetic manner.

The magnetic recording layer of the present invention can be formed by depositing magnetic and nonmagnetic materials on a substrate by, e.g., sputtering or evaporation. More specifically, co-sputtering or alternate sputtering can be performed using a magnetic metal target and a nonmagnetic matrix target in an inert gas atmosphere to form a dispersed magnetic recording layer. In this case, separate targets may be used, or a composite target may also be used. Oxygen, nitrogen, or the like may be mixed in the inert gas. In this method, the crystal structure, crystal orientation, size, and distribution of the magnetic grain can be controlled by selecting or controlling process parameters such as the input power to the target, the ultimate pressure, the sputtering pressure, the kind of reactive gas, the film deposition rate, the bias power, the kind of additive element.

A magnetic recording medium used in a magnetic recording apparatus according to the first embodiment of the present invention will be described. In this magnetic recording medium, magnetic grains are separated from a substrate by a part of a nonmagnetic matrix, and form a substantially single layer parallel to the main surface of the substrate.

Figure 2:
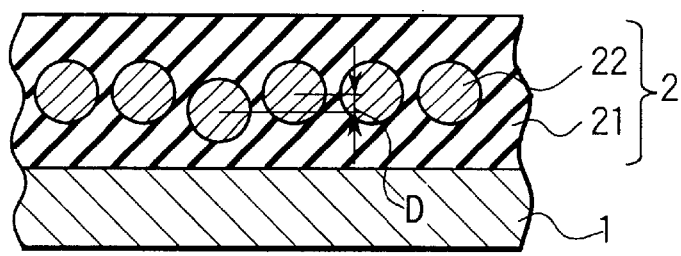
FIG. 2 is a sectional view of a magnetic recording medium according to the present invention.

FIG. 2 is a sectional view showing this magnetic recording medium. A magnetic recording layer 2 is formed on a substrate 1, and is made of a nonmagnetic matrix 21 and magnetic grains 22. The magnetic grains 22 are separated from the substrate 1 by a part of the nonmagnetic matrix 21, and do not contact the substrate 1. The average size of the magnetic grain is 10 nm or less, and desirably about 7 to 10 nm. The magnetic grain desirably has a larger average size in the vertical direction than that in the horizontal direction. The magnetic grains 22 form a single layer substantially parallel to the main surface of the substrate 1. This means that displacement D of the magnetic grain 22 in the vertical direction (level difference between the centers of the magnetic grains 22) shown in FIG. 2 is equal to or smaller than the average radius of the magnetic grain 22 in the vertical direction. The displacement D in the vertical direction is preferably 4 nm or less, and more preferably 2 nm or less.

By using the following method, the nonmagnetic matrix 21 can be arranged between the substrate 1 and the magnetic grains 22, as shown in FIG. 2. For example, in performing binary co-sputtering using a metal material target and a nonmagnetic matrix target, only the nonmagnetic matrix may be first sputtered, and then binary co-sputtering may be performed. In addition, in performing binary alternate sputtering using a metal material target and a nonmagnetic matrix target, the process may start from sputtering of the nonmagnetic matrix. Further, the growth of magnetic grains may be promoted by applying a substrate bias or heating the substrate during deposition.

Figure 3:
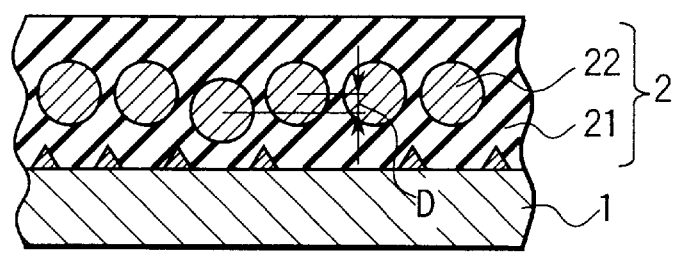
FIG. 3 is a sectional view of the magnetic recording medium according to the present invention.

In many cases, it is difficult to form a magnetic recording layer 2 containing only magnetic grains 22 which do not contact the substrate 1, as shown in FIG. 2. In practice, therefore, the magnetic recording layer 2 may contain magnetic grains 22 which contact the substrate 1, to a certain degree, in addition to the magnetic grains 22 which do not contact the substrate 1, as shown in FIG. 3.

Fine magnetic grains exhibiting superparamagnetism may exist near the surface of the recording layer 2. The superparamagnetic fine grains are not directly related to magnetization reversal (coercive force Hc and remanent magnetization Mr), but contribute to an increase in saturation magnetization Ms.

In FIG. 2, the magnetic grains 22 are completely buried in the nonmagnetic matrix 21, and are not exposed on the surface of the magnetic recording layer 2. In this case, the nonmagnetic matrix 21 can function as a protective film. Note that the magnetic grains 22 need not always be completely buried in the nonmagnetic matrix 21.

Figure 4:
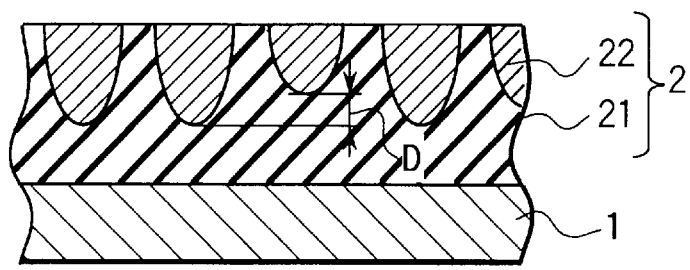
FIG. 4 is a sectional view of the magnetic recording medium according to the present invention.
Figure 5:
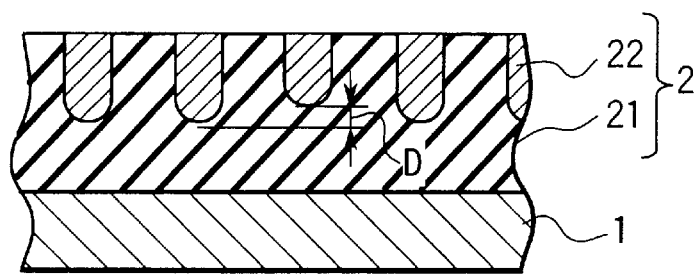
FIG. 5 is a sectional view of the magnetic recording medium according to the present invention.

For example, the magnetic grains 22 may be exposed on the surface of the magnetic recording layer 2, as shown in FIGS. 4 and 5. FIG. 4 shows a case wherein the upper portions of spheroidal magnetic grains 22 are exposed on the surface of the recording layer 2. FIG. 5 shows a case wherein the upper portions of columnar magnetic grains 22 are exposed on the surface of the recording layer 2. When the sectional shape of the magnetic grain in the vertical direction is a U shape, as shown in FIGS. 4 and 5, the level difference D between the lower ends of the magnetic grains 22 is used instead of the displacement D of the magnetic grain 22 in the vertical direction shown in FIG. 2. That is, the level difference D between the lower ends of the magnetic grains 22 is preferably smaller than the average radius of the lower end portion of the columnar grain, or the average radius of curvature. More specifically, the level difference D is preferably 4 nm or less, and more preferably 2 nm or less.

Figure 6:
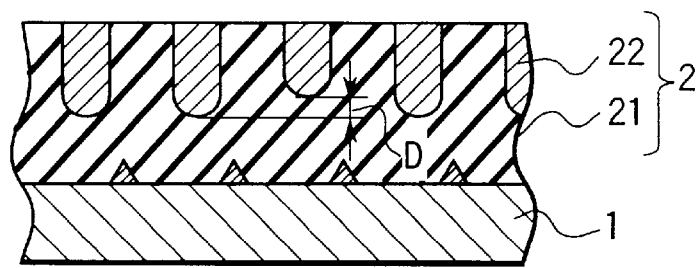
FIG. 6 is a sectional view of the magnetic recording medium according to the present invention.

Also in the cases of FIGS. 4 and 5, it is difficult to form a magnetic recording layer 2 containing only spheroidal or columnar magnetic grains 22 which do not contact the substrate 1. In practice, the magnetic recording layer 2 may contain magnetic grains 22 which contact the substrate 1, to a certain degree, in addition to the magnetic grains 22 which do not contact the substrate 1, as shown in FIG. 6.

The distribution of the magnetic grains 22 in the recording layer 2 in the in-plane direction is desirably uniform. That is, the deviation of the spacings between the magnetic grains is preferably equal to or smaller than the average size (diameter) of the magnetic grain in the in-plane direction.

In the magnetic recording medium of the present invention, the magnetic grains form a substantially single layer parallel to the main surface of the substrate, and the dispersion uniformity is very high. In the magnetic recording medium of the present invention, since many magnetic grains do not contact the substrate, magnetic coupling hardly occurs via conduction electrons between magnetic grains which contact a metal underlayer (or a conductive substrate). For this reason, the medium noise can be reduced to improve the overwrite characteristics in the dispersed magnetic recording medium of the present invention, compared to a conventional one in which magnetic grains having a large deviation in size are randomly dispersed in a nonmagnetic matrix.

A magnetic recording medium used in a magnetic recording apparatus according to the second embodiment of the present invention will be described. In this magnetic recording medium, the magnetic grain has a flat shape along the film surface, and the exchange interaction between adjacent magnetic grains in the in-plane direction is smaller than that in the perpendicular direction.

Figure 7:
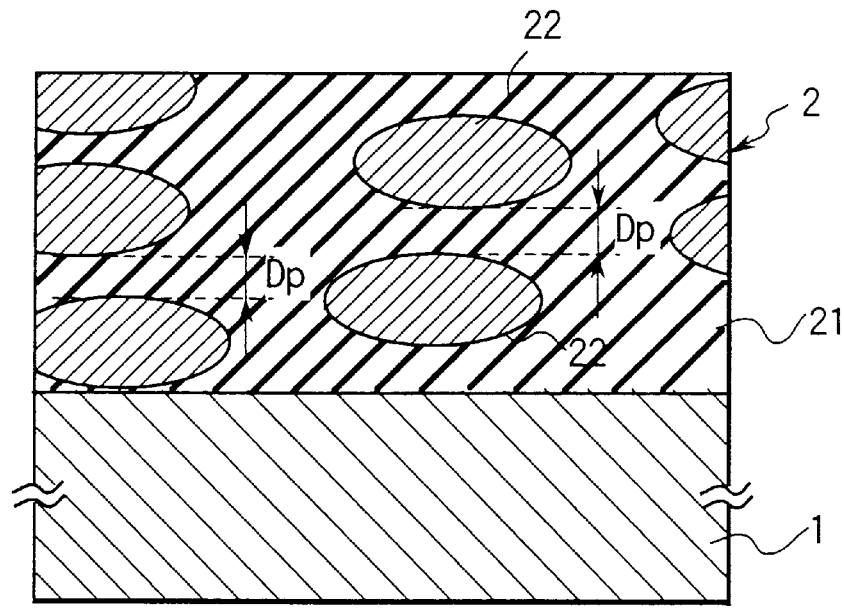
FIG. 7 is a view showing a TEM image of a section of the magnetic recording medium according to the present invention.

FIG. 7 is a schematic view showing the TEM image of the section of this magnetic recording medium. As shown in FIG. 7, a magnetic recording layer 2 is formed on a substrate 1. The magnetic recording layer 2 has a structure in which magnetic grains 22 having a flat shape along the film surface are dispersed in a nonmagnetic matrix 21. The magnetic grain preferably has a spheroidal shape with a major axis parallel to the in-plane direction, or a similar shape.

When the major axis of the spheroidal magnetic grain is the rotation axis, the grain shape appearing on the film surface is an elliptic shape. In this case, the major axis of the magnetic grain is preferably parallel to the tangential direction of the magnetic disk. The direction of the magnetic grain can be controlled by deposition in a magnetic field, or the like. The ratio of the minor axis/major axis of the magnetic grain is preferably 0.3 to 0.9, and more preferably 0.3 to 0.5.

In the magnetic recording medium of the present invention, magnetization information recorded in the in-plane direction can be stably stored because the magnetic grain has a flat grain shape along the film surface, and exhibits large shape magnetic anisotropy and large magnetocrystalline anisotropy in the in-plane direction. Therefore, high-density longitudinal recording can be realized. In addition, it is easy to independently control the magnetocrystalline anisotropy and the shape magnetic anisotropy because their origins are different.

In the present invention, the exchange interaction between adjacent magnetic grains in the in-plane direction is smaller than that in the perpendicular direction. That is, only the magnetic interaction between the magnetic grains in the in-plane direction is disrupted, and proper magnetic interaction is left in the perpendicular direction. In this dispersed state of the magnetic grains, the transition region between recording bits can be decreased to reduce the medium noise. In addition, data can be completely erased in overwrite recording because the magnetic interaction acts between the magnetic grains in the perpendicular direction to promote simultaneous rotation of magnetic clusters.

The above-described dispersed state of the magnetic grains can be defined by the average spacings between the magnetic grains in the perpendicular and in-plane directions. In the present invention, the average value of the spacings between nearest grains is preferably 0.5 to 2 nm, and more preferably 0.5 to 1 nm in the perpendicular direction, while it is preferably 2 nm or more, and more preferably 3 to 15 nm in the in-plane direction.

A spacing $D_P$ between nearest grains in the perpendicular direction can be obtained by observing a longitudinal section of the magnetic recording layer with a scanning electron microscope (SEM) or a transmission electron microscope (TEM). It is preferable that the sample to be observed with the TEM is polished by physical etching such as ion milling or chemical etching to decrease the thickness of the observed portion to 10 nm or less, and more preferably to 1 nm or less. With this polishing, since two or more magnetic grains do not exist overlapping each other along the direction of thickness of the sample, the average grain spacing in the perpendicular direction can be accurately measured.

The spacing between nearest grains in the perpendicular direction can be defined by the spacing between two tangents when tangents (indicated by broken lines in FIG. 7) are drawn in the horizontal direction for an arbitrary pair of grains adjacent in the perpendicular direction. A given number of pairs of grains, that gives statistically reliable results are measured to obtain the average value.

Figure 8:
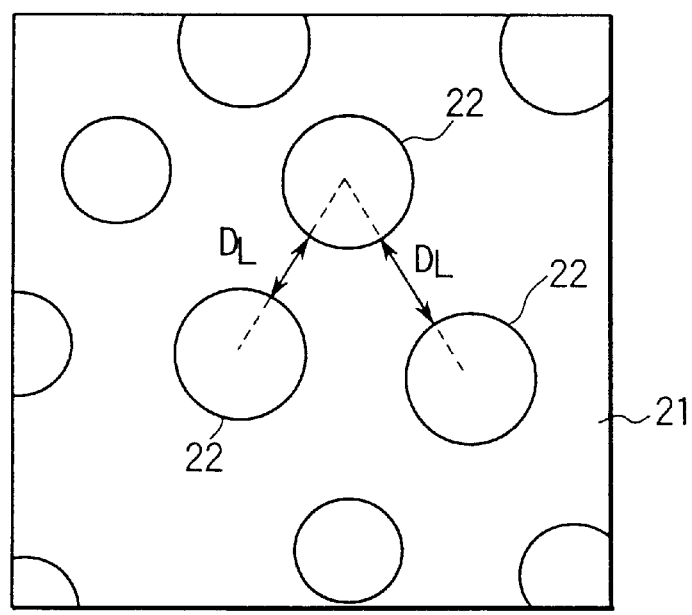
FIG. 8 is a top view showing a TEM image of the magnetic recording medium according to the present invention.
Figure 9:
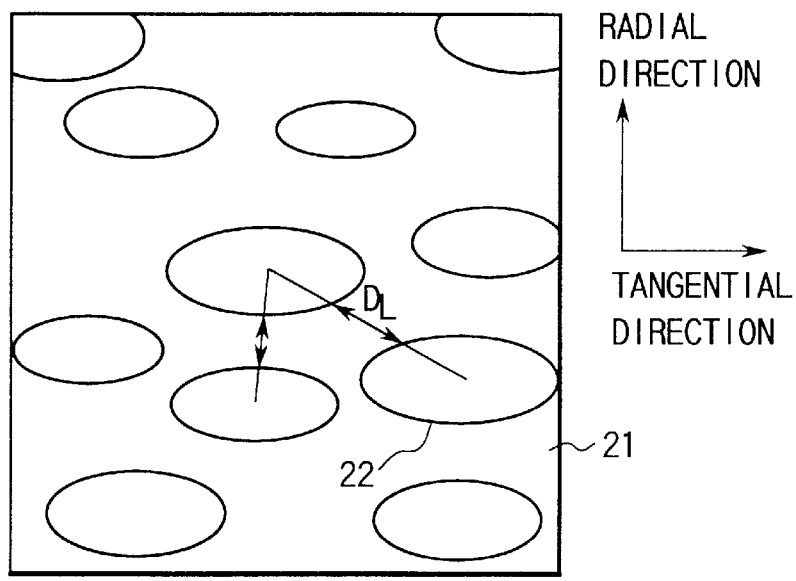
FIG. 9 is a top view showing a TEM image of the magnetic recording medium according to the present invention.

Similarly, a spacing $D_L$ between nearest grains in the in-plane direction can also be obtained by observation with an SEM or the TEM. FIG. 8 is a top view showing a TEM image when the rotation axis of the spheroidal grain agrees with the minor axis (perpendicular direction). The spacing between nearest grains in the in-plane direction can be defined by the spacing between the grains when the centers of an arbitrary pair of grains adjacent in the observation plane are connected. When the rotation axis of the spheroidal grain is its major axis (in-plane direction), the grain shape appearing on the surface is elliptic. Also in this case, as shown in FIG. 9, the spacing between nearest grains in the in-plane direction can be defined by the spacing between the grains when the centers of an arbitrary pair of grains adjacent in the observation plane are connected. A given number of pairs of grains, that gives statistically reliable results are measured to obtain the average value.

A magnetic recording medium used in a magnetic recording apparatus according to the third embodiment of the present invention will be described below. In this magnetic recording medium, magnetic grains include island-like magnetic grains. The average value of an angle defined by the side surface of the island-like magnetic grain and the main surface of the substrate is 75° or less.

Figure 10:
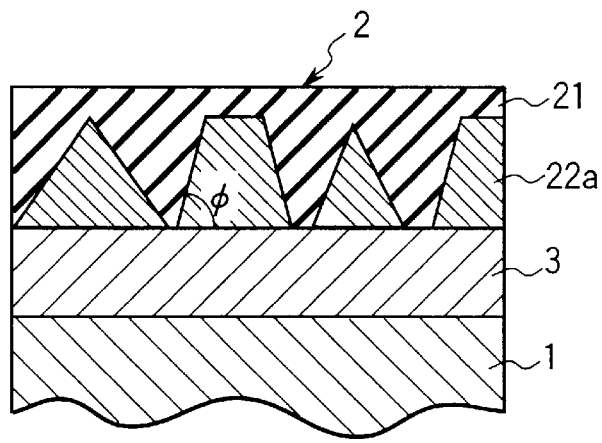
FIG. 10 is a sectional view of the magnetic recording medium according to the present invention.

FIG. 10 shows an example of the dispersed state of magnetic grains in this magnetic recording layer. In FIG. 10, an underlayer 3 is formed on a substrate 1, and a magnetic recording layer 2 is formed thereon. The magnetic recording layer 2 has a structure in which island-like magnetic grains 22a each having an inclined surface with respect to the substrate surface are dispersed in a nonmagnetic matrix 21. These magnetic grains 22a are directly grown on the underlayer 3.

Although the magnetic grain 22a has a conical shape or a frustoconical shape in FIG. 10, it may have a semispherical shape or a dome shape. Although the bottom portions of adjacent magnetic grains 22a are separated in FIG. 10, they may be partially connected. The height of the island-like magnetic grain 22a is preferably 20 nm or less, and the size of the bottom surface is preferably 20 nm or less.

The average value of the angle (represented by φ in FIG. 10) the side surface of the magnetic grain 22a makes with the surface of the substrate is 75° or less. This angle is only the average value, and its maximum value may be about 85°. This angle is preferably 30° to 70°, and more preferably 45 to 70°.

To grow the island-like magnetic grain 22a like the one shown in FIG. 10, it is effective to form an underlayer 3 having a specific crystal orientation. A material preferable for forming such a crystalline underlayer includes Cr, V, Ti, Pt, Pd, Ir, and ZnO. The underlayer may be amorphous as long as it has surface energy suitable for growing an island-like magnetic grain. A material preferable for forming such an amorphous underlayer includes CoZrNb, NiNb, Sb, Ge, and C. If an underlayer made of one of these materials is formed to have a thickness of 200 nm or less on an arbitrary substrate, island-like magnetic grains can be easily grown. If no underlayer is disposed, island-like magnetic grains can be grown on the substrate by optimizing the deposition conditions.

Figure 11:
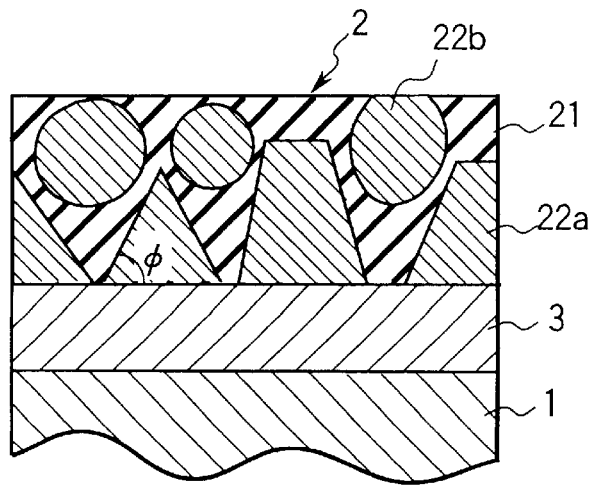
FIG. 11 is a sectional view of the magnetic recording medium according to the present invention.

The magnetic recording layer 2 may contain not only island-like magnetic grains having an inclined surface with respect to the substrate, but also flat magnetic grains separated from the island-like magnetic grains by the nonmagnetic matrix. FIG. 11 shows an example of the dispersed state of the magnetic grains in this magnetic recording layer. As shown in FIG. 11, flat magnetic grains 22b exist together with the island-like magnetic grain 22a in the nonmagnetic matrix 21. Although the shape of the flat magnetic grain 22b is not particularly limited, it is typically a spheroidal shape. The size of the flat magnetic grain 22b in the in-plane direction is preferably 5 to 15 nm, and more preferably 5 to 10 nm. The island-like magnetic grain 22a and the flat magnetic grain 22b are preferably separated by the nonmagnetic matrix 21 by 1 nm or more, and preferably by 2 nm or more.

Since this magnetic recording medium contains the island-like magnetic grains, the volume between the magnetic grains effectively increases, compared to the case of a convectional columnar magnetic grain. For this reason, the magnetic interaction between the magnetic grains can be reduced to reduce the medium noise. This effect can be obtained only when the average value of the angle defined by the side surface of the island-like magnetic grain and the substrate surface is 75° or less. Since the shape magnetic anisotropy energy of the island-like magnetic grain in the in-plane direction is larger than that of the columnar magnetic grain, a large coercive force can be attained especially in longitudinal recording. Since the crystallinity of the island-like magnetic grain is higher than that of the spherical magnetic grain, the island-like magnetic grain is advantageous in magnetocrystalline anisotropy. Particularly when the crystalline underlayer is disposed, the island-like magnetic grain is further advantageous because its crystallinity is improved.

In the present invention, the content of magnetic elements in the central region of the nonmagnetic matrix between the magnetic grains is preferably 20 atomic % or less. The content of the constituent element of the nonmagnetic matrix in the central region of the magnetic grain is not particularly limited.

Figure 12:
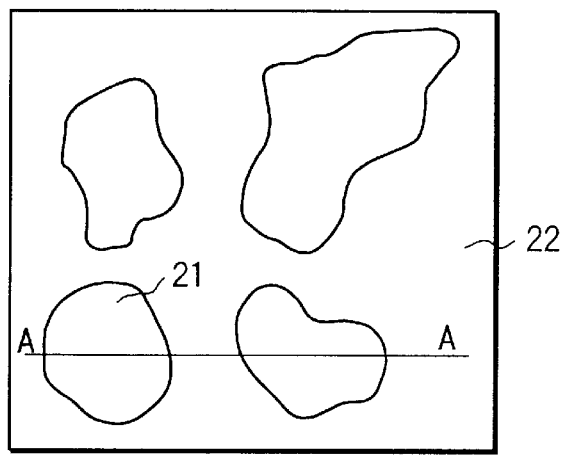
FIG. 12 is a top view showing a TEM image of the magnetic recording medium according to the present invention.
Figure 13:
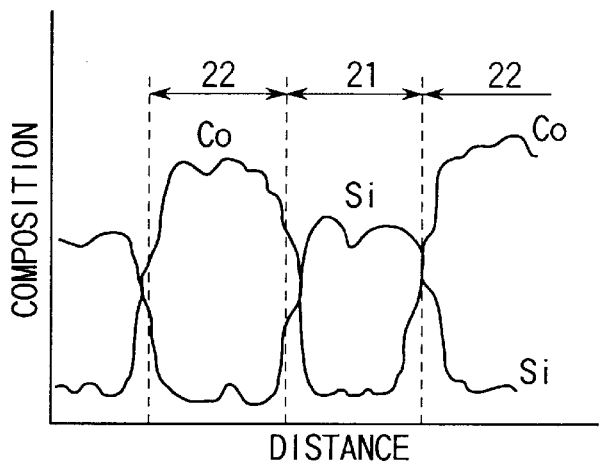
FIG. 13 is a graph showing the composition distribution on a line segment A in FIG. 12.

The definition of the central regions of the magnetic grain and the nonmagnetic matrix will be described. FIG. 12 shows an example of a top TEM image of a magnetic recording layer in which a magnetic grain is formed from CoPt, and a nonmagnetic matrix is formed from Si—O. In FIG. 12, reference numeral 21 denotes a nonmagnetic matrix mainly formed from Si—O; and 22, a magnetic grain mainly formed from CoPt. These portions can be distinctly discriminated because the crystal lattices and the contrasts of images discontinuously change in the top TEM image. FIG. 13 shows the composition distribution of Si and Co on a line segment A in FIG. 12. This fine composition analysis can be obtained by an energy analysis at the same time as the image in FIG. 12. The boundaries between the magnetic grains 22 and the nonmagnetic matrix 21 determined from FIG. 12 are indicated by broken lines in FIG. 13. The central regions of the nonmagnetic matrix and the magnetic grain mean the 80% central regions of the regions 21 and 22 in FIG. 13. To eliminate variations caused by the selection manner of the line segment A, the above analysis is performed a plurality of numbers of times to calculate the average value.

Figure 14:
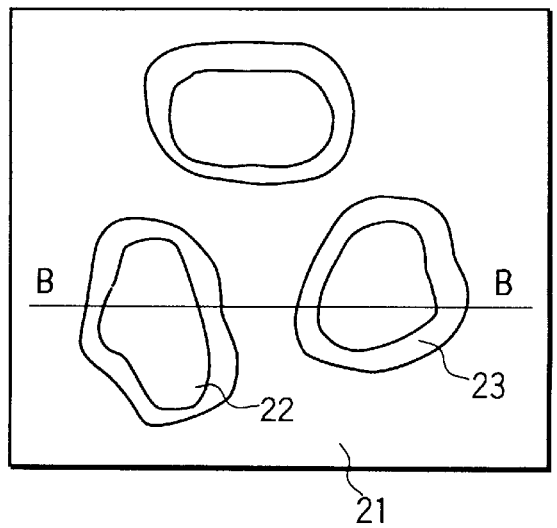
FIG. 14 is a top view showing a TEM image of the magnetic recording medium according to the present invention.
Figure 15:
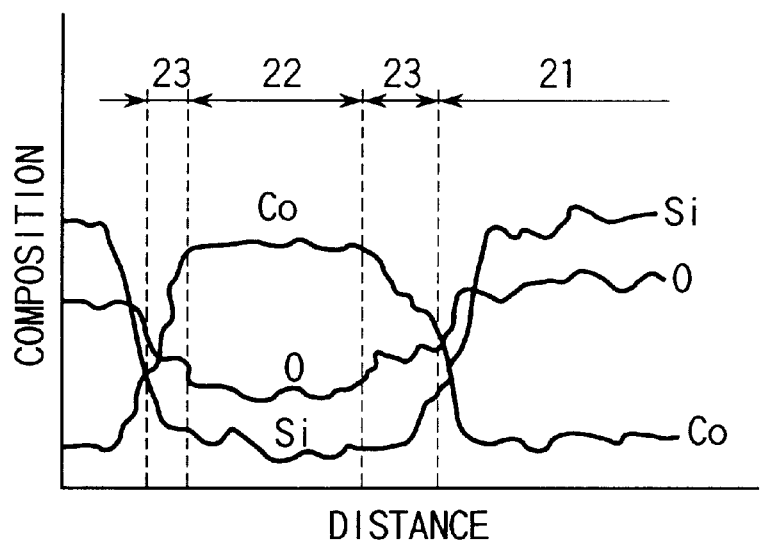
FIG. 15 is a graph showing the composition distribution on a line segment B in FIG. 14.

FIG. 14 shows an example of a top TEM image when an interface phase exists between a magnetic grain and a nonmagnetic matrix which have the same compositions as in FIG. 12. Reference numeral 21 denotes a nonmagnetic matrix mainly formed from Si—O; 22, a magnetic grain mainly formed from CoPt; and 23, an interface phase formed from amorphous Co—O. Similar to the case in FIG. 12, these portions can be distinctly discriminated on the top TEM image. FIG. 15 shows the results of a composition analysis on a line segment B in FIG. 14. Also in FIG. 15, the central regions of the nonmagnetic matrix and the magnetic grain mean the 80% central regions of the regions 21 and 22.

The magnetic recording medium of the present invention has a structure in which the magnetic grains and the nonmagnetic matrix coexist as they are separated. Microscopically, atoms constituting the magnetic grains and the nonmagnetic matrix may diffuse in or upon forming a thin film, so it is impossible to form a dispersed film in which the magnetic grains and the nonmagnetic matrix are completely separated at the atomic level.

To obtain the effect of disrupting the magnetic interaction between the magnetic grains by the nonmagnetic matrix, the content of the constituent element of the magnetic grain in the central region of the nonmagnetic matrix is preferably 20 atomic % or less.

Figure 16:
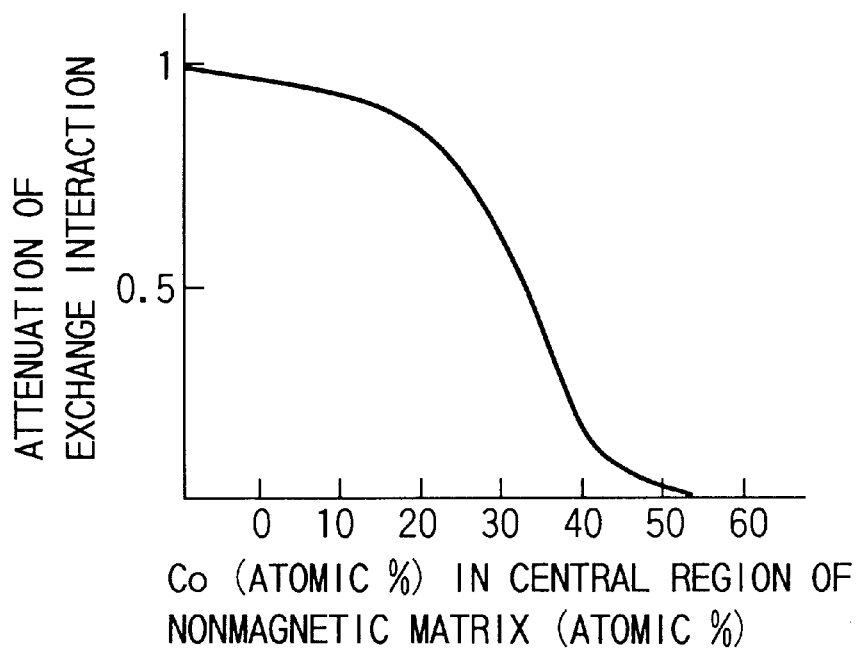
FIG. 16 is a graph showing the relationship between the Co amount in the central region of the nonmagnetic matrix and the attenuation amount of the exchange interaction in the magnetic recording medium according to the present invention.

FIG. 16 shows the attenuation amount of the exchange interaction with respect to the Co amount in the central region of the nonmagnetic matrix in the example of FIG. 12. In FIG. 16, the attenuation amount of the exchange interaction when the Co amount in the nonmagnetic matrix present between two magnetic grains is 0% is defined as 1. When the Co amounts in the nonmagnetic matrix are 5, 10, and 20 atomic %, the attenuation amounts are 0.99, 0.97, 0.95, respectively. When the Co amount is 50 atomic %, the exchange interaction hardly attenuates. From this result, the allowable concentration of the magnetic element in the central region of the nonmagnetic matrix is 20 atomic % or less, preferably 10 atomic % or less, and more preferably 5 atomic % or less.

On the other hand, the content of the constituent element of the nonmagnetic matrix in the central region of the magnetic grain is not particularly limited, and need only be about 50% or less.

Figure 17A:
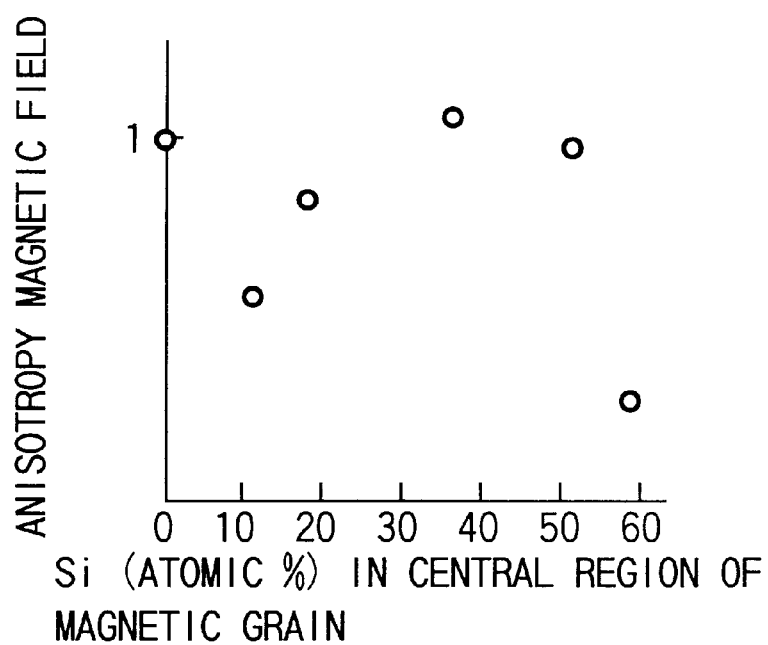
FIGS. 17A and 17B are graphs, respectively, showing the relationship between the Si and O amounts in the central region of the magnetic grain and the anisotropy magnetic field in the magnetic recording medium according to the present invention.
Figure 17B:
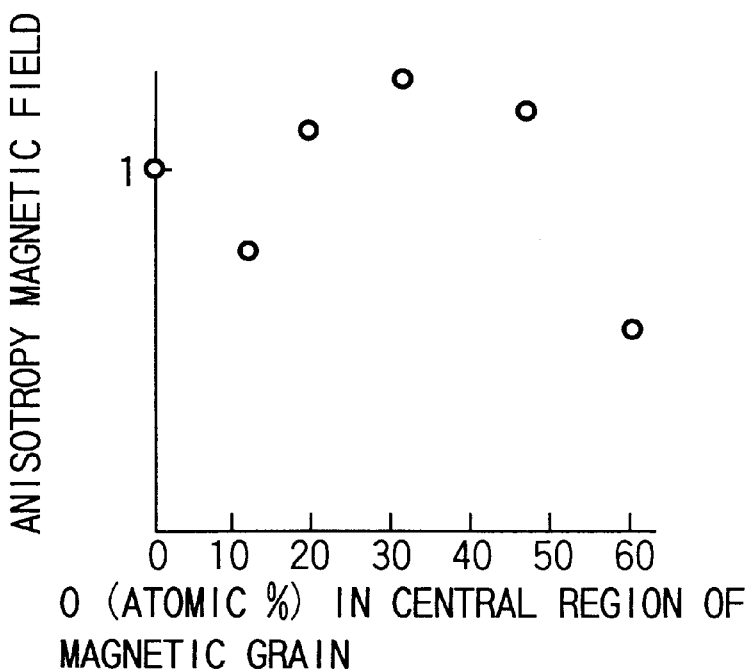

FIGS. 17A and 17B respectively show changes in anisotropy magnetic field (Hk) with respect to the Si and O amounts in the central region of the magnetic grain in the example of FIG. 12. In FIGS. 17A and 17B, the anisotropy magnetic field when the Si or O amount in the central region of the magnetic grain is 0 is defined as 1. Although Hk tends to decrease until the Si amount reaches 10 atomic %, it is almost 1 when the Si amount falls within the range of about 20 to 53 atomic %, and abruptly decreases when the Si amount reaches 60 atomic %. Changes in Hk with respect to the O amount also exhibit the same trend. In the range wherein the O amount exceeds 20 atomic %, Hk is larger than that obtained when the O amount is 0 atomic %. With an increase in Hk, the macroscopic coercive force of the entire recording layer increases to enable high-density recording. The stability against heat is improved to improve the recording hold characteristics. Therefore, the concentration of the constituent element of the nonmagnetic matrix in the central region of the magnetic grain is preferably 25 to 53%, and more preferably 30 to 45%.

Hk changes in the above manner with respect to the concentration of the constituent element of the nonmagnetic matrix in the central region of the magnetic grain due to the following reason. When the magnetic grains are dispersed in the nonmagnetic matrix so as not to cause the exchange interaction, the magnetic grains are stressed by the matrix. As a result, the lattice constant shifts from that of the bulk having the same composition. For example, a bulk Co—Pt alloy has the largest magnetic anisotropy energy for a composition of $Co_3Pt$. In the dispersed magnetic recording layer, however, even when the magnetic grain has the composition of $Co_3Pt$, a magnetic anisotropy energy equal to that of the bulk cannot be obtained due to the shift of the lattice constant. If the constituent element of the nonmagnetic matrix is mixed in the magnetic grain, strain concentrates in the peripheral portion of the element. As a result, the lattice constant of magnetic grains becomes almost equal to that of the bulk to increase the magnetic anisotropy energy. Depending on the combination of the magnetic grain and the matrix, the constituent element of the nonmagnetic matrix may be mixed in the magnetic grain to strain the magnetic grain, and to produce strain-induced magnetic anisotropy, obtaining a magnetic anisotropy energy equal to or larger than that of the bulk.

Other conditions which the magnetic recording layer should satisfy in order to realize high-density recording using the magnetic recording medium in the present invention will be described below. Of the physical properties of the magnetic recording layer, the packing, the resistivity, and the magnetic characteristics of the entire recording layer will be described below.

(1) Packing Ratio

The packing ratio of the magnetic grains in the nonmagnetic matrix greatly influences the hardness, magnetic characteristics, and the like of the magnetic recording layer. Assuming that the magnetic grain has a columnar shape, and the orientation of the grains when viewed from the bottom surface is hcp, a packing ratio p is given by $p = 2\pi a^2/(3^{1/2} \cdot (2a+b)^2)$ using a radius a of the grain and a spacing b between the grains. It is known that the size of a crystal grain in a typical thin magnetic film in current use is 40 nm, and that the distance required to disrupt the exchange interaction between the grains is at least about 1 nm. Substituting these values into the above equation yields a packing ratio p of 0.7 or less. To more completely disrupt the exchange interaction and reduce the medium noise, the value of the packing ratio is preferably 0.5 or less. Even if the orientation viewed from the bottom surface of the magnetic grain is not hcp but fcc, the exchange interaction between the magnetic grains can be effectively disrupted with a packing ratio of 0.7 or less on the basis of the same calculation. The optimal value of the packing ratio is determined by the specification of a hard disk drive.

Various characteristics can be improved by changing the packing ratio along the perpendicular direction of the magnetic recording layer.

For example, if the packing ratio is changed such that portions having high packing ratio and portions having low packing ratio alternately appear along the perpendicular direction of the magnetic recording layer, the internal stress can be dispersed. If the internal stress of the magnetic recording layer is relaxed, the adhesion properties of the magnetic recording layer with respect to the substrate are improved to improve the durability of the magnetic recording medium. As a result, defects which can cause burst noise can be decreased. This manner of changing the packing ratio is only an example. Since the value of the internal stress changes depending on the deposition conditions of the magnetic recording layer, the packing ratio is properly changed in accordance with each case.

If the packing ratio is decreased from the substrate surface toward the surface of the recording layer, the ratio of the high-hardness nonmagnetic matrix may increases to increase the hardness of the surface of the magnetic recording medium. If such an effect is obtained, the durability of the magnetic recording medium against a head crash or the like can be improved. In this case, even if the head is brought into contact with the magnetic recording medium to perform recording/reproduction, since the magnetic recording medium has sufficient durability, high-density recording is enabled.

To the contrary, if the packing ratio is increased from the substrate surface toward the surface of the recording layer, since the magnetization on the surface of the magnetic recording surface becomes large, a large reproduction output can be attained. When the substrate and the nonmagnetic matrix are formed from similar materials, and their coefficients of thermal expansion and the like are similar, the adhesion properties between the substrate and the magnetic recording layer can be improved.

When the magnetic head is brought into contact with the magnetic recording layer to record, high hardness and good insulating properties are required on the surface of the magnetic recording layer. Therefore, the ratio of the magnetic grains on the surface of the magnetic recording layer is also one important parameter. The value of (area of magnetic grains)/(area of nonmagnetic matrix) on the surface of the magnetic recording layer is preferably 0.7 or less, similar to the packing ratio of the magnetic grains, and more preferably 0.5 or less.

(2) Electrical Resistivity

The resistivity of the magnetic recording layer can be controlled by the packing ratio of the magnetic grains or an additive element in the nonmagnetic matrix.

If the resistivity of the magnetic recording layer is 1 $\Omega \cdot$cm or more, the magnetic recording layer can be sufficiently considered as an insulator, compared to the conductor portion of the head. The head can be prevented from being damaged by a leakage current when the head contacts the magnetic recording layer. When the conductor portion of the head is micropatterned, like an MR head, the resistance of the micropatterned portion increases. Therefore, the resistivity of the magnetic recording layer is preferably $10^5$ $\Omega \cdot$cm or more. To maintain complete insulating properties, the resistivity is preferably $10^{10}$ $\Omega \cdot$cm or more.

When a medium having a magnetic recording layer formed on a glass disk is rotated at a high speed, electric charges are generated on the disk due to friction with the atmosphere. If the electric charges stored on the disk are discharged to the magnetic head, the head element may be damaged. Even when the electric charge amount is small, if the cross section of the conductor portion of the magnetic head is small, the current density increases. For this reason, the damage to the head element is becoming a serious problem along with an increase in integration of the element. To solve this problem, the medium preferably has conductivity to a certain degree. However, if the medium is a conductor, a leakage current is generated from the head element. Therefore, the resistivity is preferably $10^{-4}$ to $10^5$ $\Omega \cdot$cm.

A matrix material having a resistivity of $10^{-4}$ $\Omega \cdot$cm or more includes indium tin oxide (ITO). A matrix material having a resistivity of $10^{-2}$ $\Omega \cdot$m or more includes a transition metal nitride such as Ti—N, Ta—N, or Ti—C. As a matrix material having a higher resistivity, a normal insulating material such as Si—O, Al—N, or B—N may be used.

The balance between the insulating properties and electrical conduction of the magnetic recording layer is determined by the system arrangement of a head or disk drive to be used.

The specification requirement of the resistivity of the magnetic recording layer is preferably met even between the spindle and any conductor portion of the head. Therefore, the resistivities between the spindle and a plurality of portions of the head are measured and evaluated, while the head is in contact with the medium.

(3) Magnetic Characteristics of Entire Magnetic Recording Layer

Figure 18:
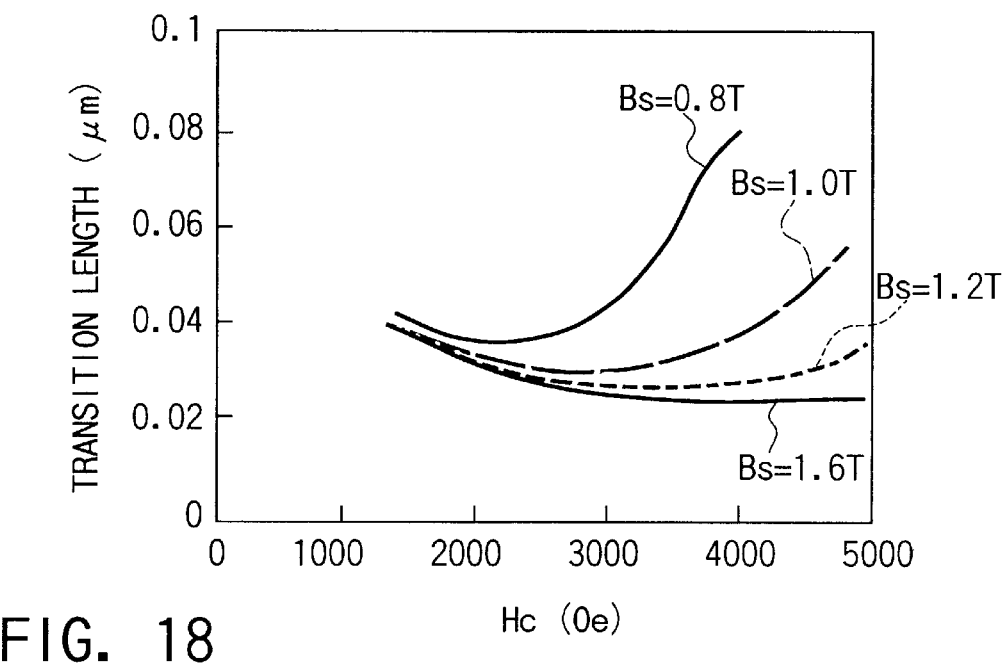
FIG. 18 is a graph showing the relationship between the coercive force and the transition length in the magnetic recording medium according to the present invention by using the saturation magnetic flux density of the pole of a recording head as a parameter.

The coercive force Hc of the magnetic recording layer is preferably 2 kOe or more in order to enable recording at a high density of 1 Gb/in$^2$ or more, and preferably 3 kOe or more in order to achieve recording at a very high density of about 10 Gb/in$^2$. Hc of the magnetic recording layer is closely related to a saturation magnetic flux density Bs of the recording head. FIG. 18 shows the relationship between the coercive force Hc of the magnetic recording layer and the transition length by using Bs of the head magnetic pole as a parameter. FIG. 18 shows the simulation results obtained by a computer when the recording track width is 3 μm, the gap length is 0.25 μm, and the spacing is 0.06 μm. The minimum point of each curve is the minimum length of the magnetic domain in which recording can be performed by a head having each Bs value, i.e., a condition for attaining the maximum recording density. That is, Hc at the minimum point of each curve is Hc required to attain the maximum recording density. The value of Hc is 2,200 Oe for Bs=0.8 T, 2,800 Oe for Bs=1.0 T, 3,500 Oe for Bs=1.2 T, and 4,500 Oe for Bs=1.6 T. From these results, Hc of the magnetic recording medium is preferably ½ or less, and more preferably ¼ or less Bs of the head in the CGS system of units.

Various physical properties which the magnetic grain itself should satisfy in order to realize high-density recording using the magnetic recording medium of the present invention will be examined.

(a) Volume of Magnetic Grain

It is generally known that, if a magnetic substance becomes very small, the magnetization cannot be kept aligned in a predetermined direction due to thermal fluctuations. Time changes in magnetization I due to the thermal fluctuations of the magnetic substance having a magnetic anisotropy energy Ku and a volume v is expressed by $$I(t)=Is \cdot exp(-t/\tau)$$

where t is time, τ is the relaxation time, and Is is the initial magnetization value. Further, τ is given by $$\tau=\tau_O \cdot exp(v \cdot Ku/kT)$$

where $\tau_O$ is about $10^{-9}$, k is the Boltzmann constant, and T is the absolute temperature. τ is required to be 10 years or more which is a practical recording storage time. The condition under which τ is a value of 10 years or more at room temperature (T=300 K) is v·Ku>1.7×10$^{-19}$ J. Substituting 9.5×10$^6$ J/m into Ku for SmCo as an example, v becomes 1.8×10$^{-26}$ m$^3$. Therefore, if the volume of the magnetic grains is equal to or larger than this value, magnetization does not vanish due to the thermal fluctuations, and the magnetic recording medium can be practically used.

(b) Size of Magnetic Cluster

A magnetic domain is formed on the magnetic recording layer by a magnetic field from the magnetic head, and serves as one recording unit of information. If the minimum magnetic domain size on the magnetic recording layer is larger than the magnetic domain to be formed, the S/N ratio of the signal deteriorates, and reproduction cannot be performed in the worst case. The minimum magnetic domain size can be estimated by the magnetic cluster size when the magnetic recording medium is AC-demagnetized. The length of the recording magnetic domain in the linear direction for attaining a recording density of 1 Gb/in$^2$ is 150 nm (Murdock, IEEE Trans. Magn., Vol. 28, p. 3,078 (1992)). Therefore, if the average size of the magnetic cluster is set smaller than this value, recording at a high density of 1 Gb/in$^2$ or more is possible. In practical use, however, the noise level increases unless several magnetic clusters fall within the short side of the magnetic domain. Therefore, the size of the magnetic cluster is preferably 100 nm or less, and more preferably 50 nm or less. To realize reproduction at a high S/N ratio, the size of the magnetic cluster is more preferably 30 nm.

(c) Size of Magnetic Grain

In the dispersed magnetic recording layer, since the magnetic grains are separated from each other to such a degree as not to give rise to the exchange interaction, the magnetic grain is the minimum unit of magnetization reversal. When the size of the magnetic grain is equal to or larger than the magnetic cluster size when the magnetic recording layer is AC-demagnetized, the shape of the magnetic domain formed in the magnetic recording layer cannot reflect the magnetic field from the head, generating medium noise. In this case, if the average in-plane size of the magnetic grain (average length of the major axis for an elliptic magnetic grain) is ¹⁄₁₀ or less the average magnetic cluster size upon AC demagnetization, the medium noise can be reduced.

A lubricant for the magnetic recording layer will be described below. To realize high-density magnetic recording, the spacing between the head and the medium must be shortened, and further it is preferable to slide the head on the medium. To effectively prevent wear of the magnetic recording medium due to contact with the recording/reproduction head, a lubricant is applied on the surface of the magnetic recording medium to be used. As the lubricant, Fomblin Z-DOL, Fomblin AM2001, and the like are used. If this lubricant is nonuniformly applied to form projections, the head may collide against the projections and be damaged. For this reason, the lubricant must be uniformly applied to a thickness of about 10 nm with good adhesion properties. In a conventional film magnetic recording layer, a protective film made of carbon, silica, or the like is formed on the surface, and a lubricant is applied on the protective film. However, particularly when a silica-based protective film is used, uniform application of the lubricant is difficult due to the OH groups present on the surface. For this reason, when a silica-based protective film is formed, the OH groups are removed by a heat treatment, and then the lubricant is applied.

In the dispersed magnetic recording medium of the present invention, since the nonmagnetic matrix can function as a protective film to improve the mechanical characteristics, a spacing-loss protective film need not always be formed. If voids exist at the boundary between the nonmagnetic matrix portion or nonmagnetic matrix, and the magnetic grain, the lubricant enters the voids to improve the adhesion properties to a certain degree. Further, since polishing (vanishing) is performed before application of the lubricant after fabricating the magnetic recording layer, many voids appear on the surface to further improve the adhesion properties of the lubricant. The voids preferably have a radius of 1 nm or more, and a depth of 2 nm or more for sufficient adhesion properties.

Particularly when the surface of a dispersed magnetic recording layer using a silica-based matrix is formed from only the matrix, uniform application of the lubricant is difficult due to the OH groups present on the surface, similar to the case of the silica-based protective film. In addition, if a heat treatment is performed to such a degree as to remove the OH groups, mutual diffusion of constituent elements may occur between the magnetic grain and the matrix to degrade the magnetic characteristics. For this reason, such heat treatment is preferably avoided.

To uniformly apply the lubricant on the surface of the dispersed magnetic recording layer, the concentration of OH groups on the surface is preferably set at 4×10$^{14}$ atm/cm$^2$ or less without performing any heat treatment. As a method of decreasing the concentration of OH groups on the surface of the recording layer, an acid treatment, an ozone treatment, and the like can be employed. By performing these treatments, the OH groups are removed upon reaction with the acid or ozone to decrease the concentration of OH groups on the surface of the recording layer. Therefore, the lubricant can be uniformly applied without performing any heat treatment.

EXAMPLES

Examples of the present invention will be described below.

Example 1

An example of fabricating a magnetic recording layer having a fine structure like the one shown in FIGS. 2 to 6 will be described.

Example 1A

A 2.5" glass disk substrate, a CoPt target, and an $SiO_2$ target were set in a magnetron sputtering apparatus. While a bias of 200 W was applied to the substrate in an Ar atmosphere at 2 mTorr, binary co-sputtering (DC-sputtered for CoPt, and RF-sputtered for $SiO_2$) was performed for 5 min to form a magnetic recording layer on the substrate.

When the top surface of the magnetic recording layer was observed with an FE-TEM, the magnetic recording layer had a structure in which crystalline phases containing CoPt as a main component were dispersed in an amorphous phase containing $SiO_2$ as a main component. When a cross section of the magnetic recording layer was observed with a TEM, a nonmagnetic matrix ($SiO_2$) was present between the substrate surface and magnetic grains (CoPt). The average size of the magnetic grain in the perpendicular direction was about 8 nm. The displacement of the magnetic grain in the perpendicular direction was about 2 nm, which was equal to or smaller than the average radius of the magnetic grain. The average in-plane spacing between the magnetic grains was about 3 nm. In this manner, evidently a magnetic recording layer in which CoPt fine grains were uniformly dispersed in $SiO_2$ was formed.

When the magnetostatic characteristics of this magnetic recording layer were measured using a vibrating sample magnetometer (VSM), Hc was 2,000 Oe, and Ms was 350 emu/cc. The surface resistance of this magnetic recording layer was measured by a four-probe method to obtain a value of 1 MΩ or more.

Example 1B

A magnetic recording layer made of $CoPt/SiO_2$ was formed in the same manner as in Example 1A except that the deposition time was set at 10 min. The shape of a magnetic grain in the obtained magnetic recording layer had a U shape along the perpendicular direction. The average size of the lower end portion of the magnetic grain in the in-plane direction was about 8 nm, and the length of the magnetic grain in the perpendicular direction was about 15 to 18 nm. A nonmagnetic matrix ($SiO_2$) was found between the magnetic grains and a disk, and the magnetic grains did not contact the disk. The average displacement of the lower end of the magnetic grain was about 3 nm, which was smaller than the average radius of curvature (4 nm) of the lower end portion of the magnetic grain.

The magnetic recording layer had an Hc of 2,000 Oe, an Ms of 400 emu/cc, and a surface resistance of 1 MΩ or more.

Example 1C

A magnetic recording layer made of CoPt/TiN was formed in the same manner as in Example 1A except that TiN was used as a nonmagnetic matrix. The average size of the magnetic grain in the perpendicular direction was about 9 nm, the displacement of the magnetic grain was about 3 nm or less, and the average in-plane spacing between the magnetic grains was about 3 nm. In this manner, a magnetic recording layer in which CoPt fine grains were uniformly dispersed in the TiN matrix was formed.

The magnetic recording layer had an Hc of 1,950 Oe, an Ms of 345 emu/cc, and a surface resistance of about several Ω.

Example 1D

A magnetic recording layer made of $CoPt/SiO_2$ was formed on a glass disk having a 50-nm thick Cr underlayer on its surface in the same manner as in Example 1A. As a result, a magnetic recording layer having almost the same fine structure as that in Example 1A was obtained. This fact indicates that formation of the magnetic recording layer is hardly influenced by the Cr underlayer.

The magnetic recording layer had an Hc of 2,100 Oe, an Ms of 390 emu/cc, and a surface resistance of about several hundred kΩ.

Example 1E

A magnetic recording layer made of CoPt/TiN was formed on a glass disk having a 50-nm thick Cr underlayer on its surface in the same manner as in Example 1C. As a result, a magnetic recording layer having almost the same fine structure as that in Example 1C was obtained.

The magnetic recording layer had an Hc of 2,000 Oe, an Ms of 380 emu/cc, and a surface resistance of about several Ω.

Example 1F

A magnetic recording layer made of $CoPt/SiO_2$ was formed in the same manner as in Example 1A except that the input power to a CoPt target in sputtering was doubled. The average size of a magnetic grain was about 8 nm, the displacement of the magnetic grain in the perpendicular direction was about 2 nm or less, and the average in-plane spacing between the magnetic grains was about 2 nm. That is, this magnetic recording layer had almost the same fine structure as that in Example 1A except that the in-plane spacing between the magnetic grains was smaller. A nonmagnetic matrix ($SiO_2$) was observed between the substrate surface and the magnetic grains.

The magnetic recording layer had an Hc of 2,000 Oe, an Ms of 430 emu/cc, and a surface resistance of 1 MΩ or more.

Example 1G

A magnetic recording layer made of CoPt/TiN was formed in the same manner as in Example 1C except that the input power to a CoPt target in sputtering was doubled. The fine structure of this magnetic recording layer was almost the same as that in Example 1F.

The magnetic recording layer had an Hc of 1,900 Oe, an Ms of 420 emu/cc, and a surface resistance of several Ω.

Disks 1A to 1G were fabricated by forming magnetic recording layers under the same conditions as described above, and successively sputtering carbon to form 10-nm thick carbon protective films. The electromagnetic characteristics of these disks were evaluated using a spin stand. In recording, an MIG head having a gap length of 0.3 μm and a track width of 4.0 μm was used. In reproduction, an MR head having a gap length of 0.14 µm and a track width of 2.7 µm was used. The flying height of the head was 50 nm.

First, signals were recorded at a recording density of 150 kfci (flux change per inch), and reproduced to measure the normalized medium noise (Nm/So). As a result, the normalized medium noise was as very weak as 0.015 to 0.018 $\mu m^{1/2}\mu Vrms/\mu Vpp$ in any of the disks. When the medium S/Nm ratio was measured, it was 30 to 31 dB in disks 1A, 1C, 1D, and 1E, and 32 dB in disks 1F and 1G, and 34 dB in disk 1B. Probably, in disk 1B, the signal intensity was high to obtain a high S/Nm because magnetic grains were large and the magnetization was large. Perhaps, in disks 1F and 1G, the signal intensity was high to obtain a high S/Nm because the volume content of magnetic grains in the magnetic recording layer was large.

Next, signals were recorded at a recording density of 200 kfci, and reproduced to measure the normalized medium noise (Nm/So). As a result, the normalized medium noise was 0.017 $\mu m^{1/2}\mu Vrms/\mu Vpp$ in disk 1A, 0.015 $\mu m^{1/2}\mu Vrms/\mu Vpp$ in disk 1F, and 0.02 $\mu m^{1/2}\mu Vrms/\mu Vpp$ in disk 1G. Presumably, disk 1F exhibited a good value even at a high recording density because the density of magnetic grains was high. Also, in disk 1G, the noise probably increased due to an increase in magnetic interaction caused by the conductive matrix.

After the recording current was set at 30 mA, and signals were recorded at 20 kfci, overwrite recording was performed at 80 kfci to measure the overwrite characteristics. As a result, all of the disks exhibited a good value exceeding 40 dB.

Comparative Example 1H

A Cr underlayer was formed on a glass substrate, and a magnetic recording layer made from a thin metal film containing columnar CoCr crystals was formed on this Cr underlayer. The magnetic recording layer had an Hc of 2,400 Oe, and an Ms of 460 emu/cc.

Comparative Example 1I

A magnetic recording layer made from CoPt/SiO₂ was formed in the same manner as in Example 1D except that no substrate bias was applied in sputtering. In this magnetic recording layer, CoPt magnetic grains were randomly distributed along the perpendicular direction, and some fine grains contacted the Cr underlayer. The magnetic recording layer had an Hc of 1,990 Oe, and an Ms of 390 emu/cc.

Disks 1H and 1I were fabricated by forming magnetic recording layers under the same conditions as described above, and successively sputtering carbon to form 10-nm thick carbon protective films. The normalized medium noise in these disks was measured. As a result, the normalized medium noise was 0.022 $\mu m^{1/2}\mu Vrms/\mu Vpp$ in disk 1H, and 0.02 $\mu m^{1/2}\mu Vrms/\mu Vpp$ in disk 1I. The normalized medium noise in either disk was stronger than that in the disks of Examples 1A to 1G. When the overwrite characteristics were measured, disk 1H exhibited almost the same value as those in Examples 1A to 1G, but disk 1I exhibited a low value of −25 dB. Possibly, in disk I, the displacement of the magnetic grain in the perpendicular direction was large, the distribution in the perpendicular direction was nonuniform, and the magnetic interaction was locally promoted by the magnetic grains in contact with the substrate.

Example 2

An example of fabricating a magnetic recording layer having a fine structure shown in FIGS. 7 to 9 will be described.

Example 2A

A glass disk substrate, an Si disk substrate (both had a diameter of 2.5 inch), a CoPt target, and an SiO₂ target were set in a magnetron sputtering apparatus. While a substrate bias of 400 W was applied in an Ar atmosphere at 0.27 Pa, binary co-sputtering was performed to form a 40-nm thick magnetic recording layer on each substrate.

A section of the magnetic recording layer formed on the glass substrate was observed with a TEM to obtain a TEM image similar to that in FIG. 7. The shape of the CoPt grain dispersed in the SiO₂ matrix was elliptic, the average length of the minor axis was 3.0 nm, and the ratio of the minor axis/major axis was 0.55. The average spacing between the CoPt grains in the perpendicular direction was 1.0 nm. When the top surface of the magnetic recording layer was observed with a TEM, a TEM image similar to that in FIG. 8 was obtained. The shape of the CoPt grain dispersed in the SiO₂ matrix was circular, the average size was 5.5 nm, and the average spacing between the grains in the in-plane direction was 2.5 nm. Judging from these observation results, the formed CoPt grain had almost a flat spheroidal shape having a minor axis along the perpendicular direction as a rotation axis.

When the magnetostatic characteristics of this magnetic recording layer were measured, the magnetic recording layer had in-plane magnetic anisotropy, a coercive force of 160 kA/m (2 kOe), a saturation magnetization of 0.53 Wb/m² (424 G), and a magnetic anisotropy energy of $2.1 \times 10^6$ J/m³. When the surface of the sample upon AC demagnetization was observed with a scanning magnetic force microscope (MFM), the average magnetic cluster size was 65 nm, which was 10 times or more the diameter of the CoPt grain.

After a lubricant was applied on the magnetic recording layer formed on the Si substrate, recording/reproduction was performed to measure the noise level. The numerical data and the evaluation conditions used at this time are shown in Tables 1 and 2.

TABLE 1

|  | Recording Head | Reproduction Head |
| --- | --- | --- |
| Gap Length | 0.28 µm | 0.135 µm |
| Track Width | 5.5 µm | 2.7 µm |
| Number of Turns | 50 turn | — |

TABLE 2

| Rotational Frequency | Measurement Position | Peripheral Speed | Flying Height |
| --- | --- | --- | --- |
| 1800 rpm | 21.45 mm | 4.02 m/s | 0.05 µm |

The evaluation results reveal that the noise level upon DC erasing was almost the same as that upon recording at a predetermined frequency, and that the transition noise upon recording was nearly 0.

Figure 19:
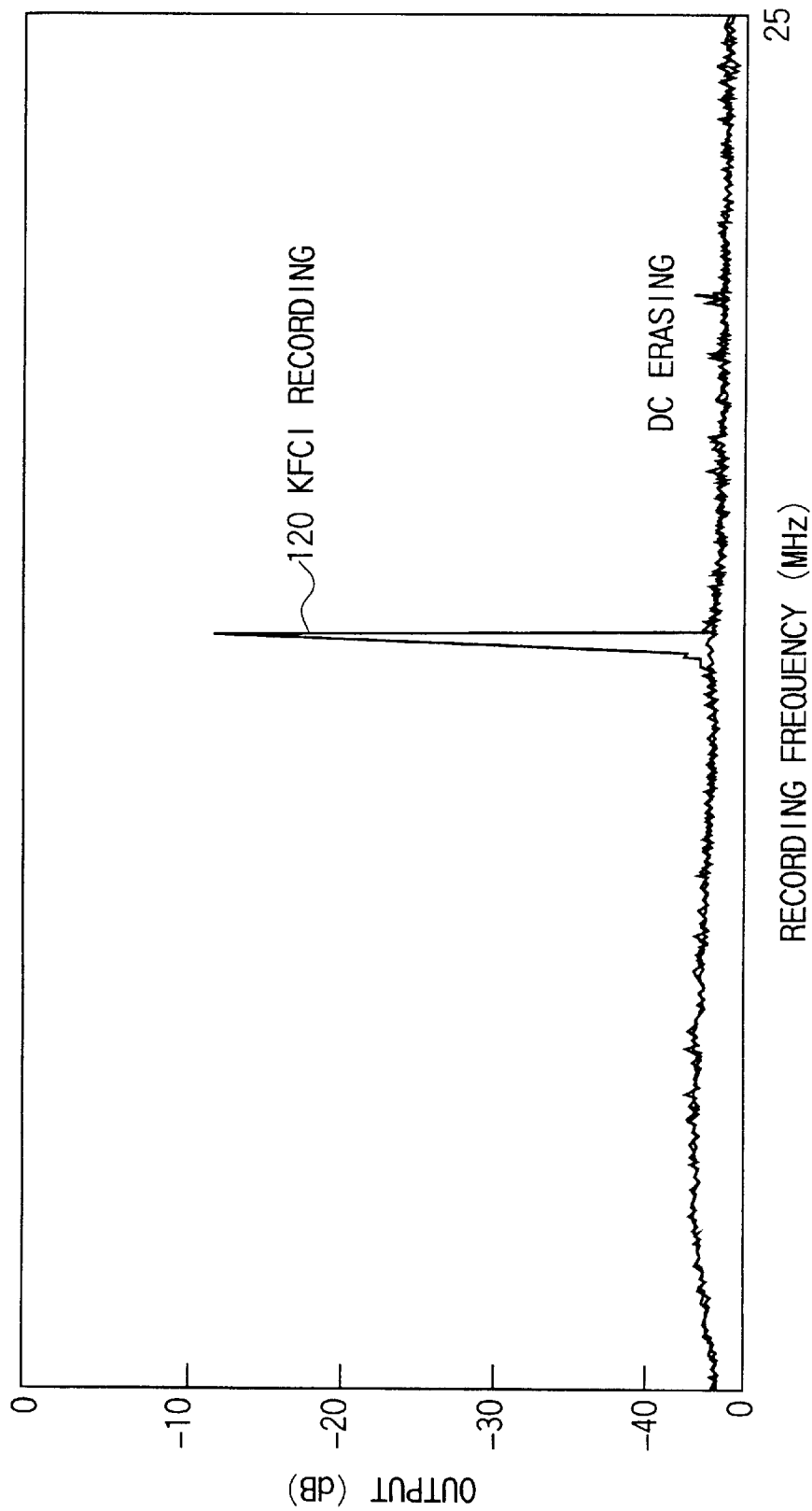
FIG. 19 is a graph showing the overwrite spectrum of a magnetic recording medium in Example 2A of the present invention.

FIG. 19 shows the overwrite spectrum obtained when overwrite recording was performed at 120 kfci after recording at a track density of 30 kfci. The erase ratio was 43 dB; good overwrite characteristics were attained.

Example 2B

A glass disk substrate, an Si disk substrate (both had a diameter of 2.5 inch), a CoPtCr target, and an Si₃N₄ target were set in an ion beam sputtering apparatus. The substrate surface was ion-etched. The two targets were alternately sputtered to form, on each substrate, a magnetic recording layer having a structure in which CoPtCr grains were dispersed in an $Si_3N_4$ matrix. The conditions at this time were as follows. After the ultimate vacuum degree immediately before the start of film formation was set at $6.7\times10^{-5}$ Pa, Ar was introduced to a pressure of at $2.4\times10^{-2}$ Pa. A permanent magnet was set on the lower surface of the disk to apply a magnetic field in the tangential direction of the disk in rotating the disk about its axis. The acceleration voltage and the beam current were respectively set at 700 V and 30 mA to start deposition. An operation of forming a 4.5-nm thick CoPtCr film, and forming a 4.5-nm thick $Si_3N_4$ film after a lapse of 10 sec was repeatedly executed to form a magnetic recording layer having a total thickness of 27 nm.

When a section of the magnetic recording layer formed on the glass disk was observed with a TEM, the shape of the CoPtCr grain dispersed in the $Si_3N_4$ matrix was elliptic. The average lengths of the minor and major axes were respectively 4 nm and 5 nm, and their ratio was 0.8. The average spacing between the grains in the perpendicular direction was 0.6 nm. When the top surface of the magnetic recording layer was observed with an SEM, elliptic grains aligned in the same direction were observed, as shown in FIG. 9. The average lengths of the minor and major axes were respectively 4 nm and 5 nm, and their ratio was 0.8. The average spacing between the grains in the in-plane direction was 2.1 nm. These observation results indicate that the formed CoPtCr grain had an almost flat spheroidal shape having a major axis along the in-plane direction as a rotation axis.

This magnetic recording layer had in-plane magnetic anisotropy, a coercive force of 176 kA/m (2.2 kOe), a saturation magnetization of 0.56 $Wb/m^2$ (448 G), and a magnetic anisotropy energy was $3.2\times10^6$ $J/m^3$. The average magnetic cluster size was 58 nm, which was 10 times or more the length of the major axis of the CoPtCr grain.

A lubricant was applied on the magnetic recording layer formed on the Si substrate, and recording/reproduction was performed to measure the noise level. The noise level upon DC erasing was almost the same as that upon recording at a predetermined frequency, and the transition noise upon recording was nearly 0.

The erase ratio obtained when overwrite recording was performed at 120 kfci after recording at a track density of 30 kfci was 42 dB; good overwrite characteristics were attained. When the magnetic recording layer upon recording was observed with an MFM, a sharp bit pattern free from any transition fluctuation between recording bits was confirmed.

Example 2C

A glass disk substrate, an Si disk substrate (both had a diameter of 2.5 inch), and Co, Fe, and Al targets were set in a magnetron sputtering apparatus. Ternary co-sputtering was performed in an Ar atmosphere containing 10%-oxygen to form a 50-nm thick magnetic recording layer on each substrate. The obtained magnetic recording layer had a structure in which CoFe grains were dispersed in a matrix having a composition of nearly $Al_2O_3$.

As a result of TEM observation of the magnetic recording layer, the CoFe grain had a spheroidal shape. The average lengths of the major and minor axes were respectively 8 nm and 3 nm, and their ratio was 0.38. The average spacing between the grains in the perpendicular direction was 1.0 nm, and the average spacing between the grains in the in-plane direction was 3.0 nm.

This magnetic recording layer had in-plane magnetic anisotropy, a coercive force of 180 kA/m (2.3 kOe), a saturation magnetization of 0.51 $Wb/m^2$ (405 G), and a magnetic anisotropy energy of $1.2\times10^6$ $J/m^3$. The average magnetic cluster size was 105 nm, which was 10 times or more the length of the major axis of the CoFe grain.

A lubricant was applied on the magnetic recording layer formed on the Si substrate, and recording/reproduction was performed to measure the noise level. The noise level upon DC erasing was almost the same as that upon recording at a predetermined frequency, and the transition noise upon recording was nearly 0.

The erase ratio obtained when overwrite recording was performed at 120 kfci after recording at a track density of 30 kfci was 42 dB; good overwrite characteristics were attained. When the magnetic recording layer upon recording was observed with an MFM, a sharp bit pattern free from any transition fluctuation between recording bits was confirmed.

Example 2D

A glass disk substrate, an Si disk substrate (both had a diameter of 2.5 inch), and crucibles respectively containing CoPt and SiO as an evaporation source were set in an electron beam evaporation apparatus. Co-evaporation was performed to form, on each substrate, a 30-nm thick magnetic recording layer having a structure in which CoPt grains were dispersed in an SiO matrix. By changing the substrate temperature during film formation, the dispersed form of the CoPt grains in the SiO matrix could be variously changed.

A magnetic recording layer obtained when the substrate temperature was set at 100° C. exhibited the most excellent noise characteristics. The measurement results of this magnetic recording layer will be first described.

As a result of TEM observation of the magnetic recording layer, the CoPt grain had a spheroidal shape. The average lengths of the major and minor axes were respectively 6.5 nm and 2.0 nm, and their ratio was 0.31. The average spacing between the grains in the perpendicular direction was 0.8 nm, and the average spacing between the grains in the in-plane direction was 2.4 nm.

This magnetic recording layer had in-plane magnetic anisotropy, a coercive force of 141 kA/m (1.8 kOe), a saturation magnetization of 0.50 $Wb/m^2$ (398 G), and a magnetic anisotropy energy of $1.2\times10^6$ $J/m^3$. The average magnetic cluster size was 71 nm, which was 10 times or more the length of the major axis of the CoPt grain.

A lubricant was applied on the magnetic recording layer formed on the Si substrate, and recording/reproduction was performed to measure the noise level. The noise level upon DC erasing was almost the same as that upon recording at a predetermined frequency, and the transition noise upon recording was nearly 0.

The erase ratio obtained when recording was performed at 80 kfci after recording at a track density of 20 kfci was 38 dB; good overwrite characteristics were attained. When the magnetic recording layer upon recording was observed with an MFM, a sharp bit pattern free from any transition fluctuation between recording bits was confirmed.

Example 3

Example 3A

A glass disk substrate, an Si disk substrate (both had a diameter of 2.5 inch), a Cr target, a $Co_{80}Pt_{20}$ target, and an SiO$_2$ target were set in a multi-target magnetron sputtering apparatus. The Cr target was sputtered to form a 60-nm thick Cr underlayer on each substrate. While a substrate bias of 400 W was applied in an Ar atmosphere at 0.27 Pa, the Co$_{80}$Pt$_{20}$ and SiO$_2$ targets were subjected to binary co-sputtering to form a 13-nm thick magnetic recording layer on the Cr underlayer.

Figure 20:
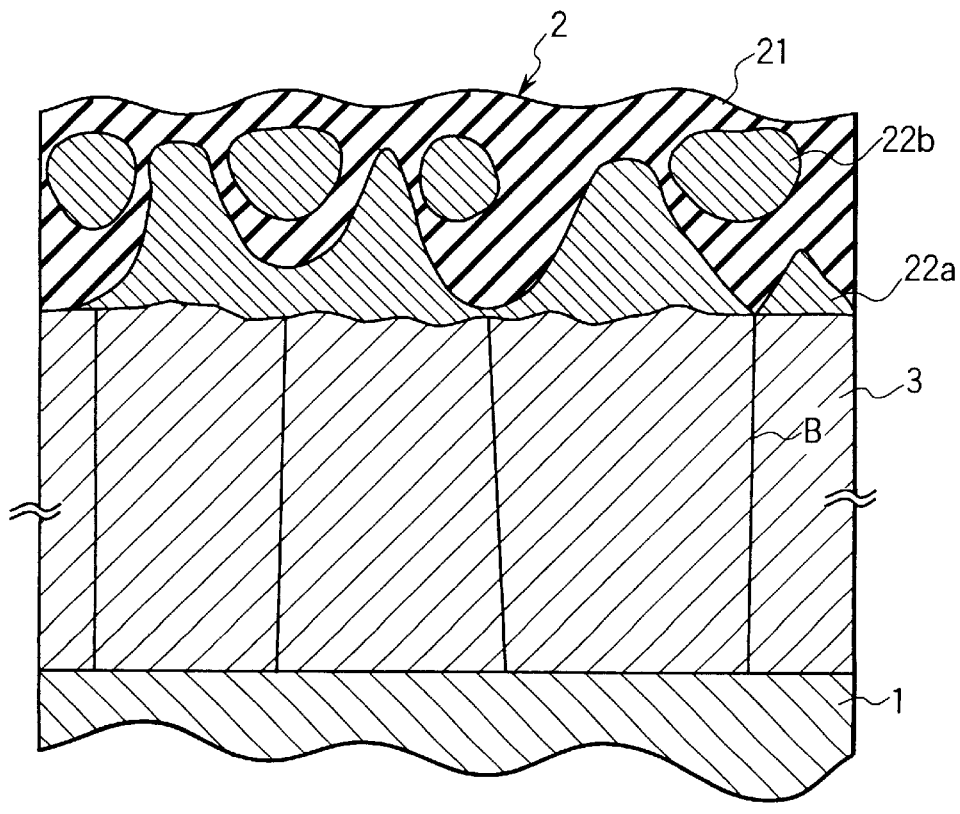
FIG. 20 is a view showing a TEM image of a section of a magnetic recording medium in Example 3A of the present invention.

FIG. 20 schematically shows a TEM image of a section of the magnetic recording layer formed on the glass disk. As shown in FIG. 20, a Cr underlayer 3 is formed on a glass disk 1, and grain boundaries exist inside. A magnetic recording layer 2 is formed on the underlayer 3. The magnetic recording layer 2 has the following fine structure. That is, conical magnetic grains 22a each directly grown on the underlayer 3 and having an inclined surface with respect to the substrate surface, and spheroidal magnetic grains 22b separated from the conical magnetic grains 22a are dispersed in a nonmagnetic matrix 21 formed from SiO$_2$. In the conical grain 22a, the average size of the bottom surface was about 16 nm, and the average angle defined by its side surface and the substrate surface was 69°. In the spheroidal grain 22b, the average size in the in-plane direction was about 9 nm, and the average spacing from the conical grain 22a was about 2.5 nm. The volume fraction of the Co$_{80}$Pt$_{20}$ grains with respect to the entire magnetic recording layer was 50 vol %.

When the magnetic characteristics of the magnetic recording layer were measured, the magnetic recording layer had in-plane magnetic anisotropy, a coercive force of 160 kA/m (2 kOe), a saturation magnetization of 0.53 Wb/m$^2$ (424 G), and a magnetic anisotropy energy of 2.1×10$^6$ J/m$^3$.

A lubricant was applied on the surface of the magnetic recording layer formed on the Si substrate via the Cr underlayer, and recording/reproduction was performed to measure the noise level. The numerical data and the test conditions at this time are the same as those in Tables 1 and 2 described above. The noise level upon DC erasing was almost the same as that upon recording at a predetermined frequency, and the transition noise upon recording was 0.35 mVrms.

Figure 21:
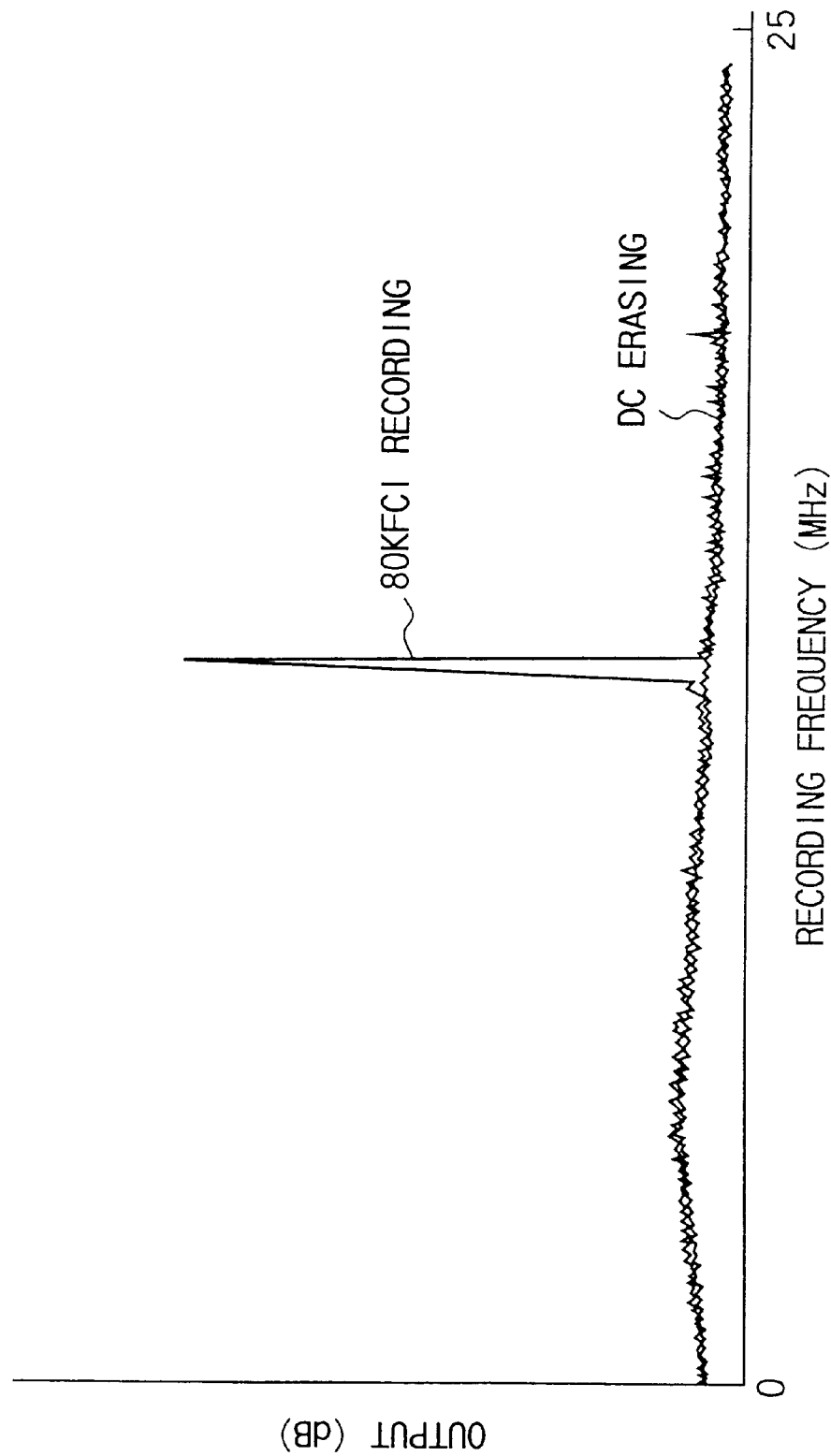
FIG. 21 is a graph showing the overwrite spectrum of the magnetic recording medium in Example 3A of the present invention.

FIG. 21 shows the overwrite spectrum obtained when overwrite recording was performed at 80 kfci after recording at a track density of 20 kfci. The erase ratio was 40 dB; good overwrite characteristics were attained.

Example 3B

A Co$_{80}$Pt$_{20}$ target and an Al$_2$O$_3$ target were used as a target. By the same method as in Example 3A, 12 kinds of magnetic recording layers were formed by variously changing the sputtering conditions in forming magnetic recording layers on glass disks and Si disks. The shape of an island-like (conical or frustoconical) magnetic grain could be changed by changing the type of rare gas and the pressure during deposition, the substrate temperature, the substrate bias conditions, the type and thickness of underlayer, and the like. The thicknesses of the formed magnetic recording layers fell within the range of 10 to 40 nm.

Figure 22:
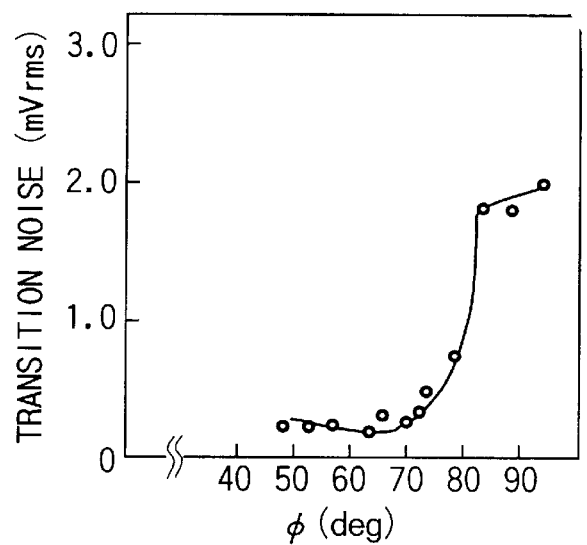
FIG. 22 is a graph showing the relationship between an angle $\phi$ defined by the side surface of an island-like magnetic grain and the substrate surface, and the transition noise in a magnetic recording medium in Example 3B of the present invention.

A section of each magnetic recording layer formed on the glass disk was observed with a TEM to obtain the average value of the angle φ the side surface of the island-like grain makes with the substrate surface. A recording/reproduction test was performed for each magnetic recording layer formed on the Si disk to obtain the transition noise upon recording at a recording density of 150 kfci. FIG. 22 shows the relationship between the angle φ defined by the side surface of the island-like grain and the substrate surface, and the transition noise.

In FIG. 22, the case of φ=90° corresponds to a magnetic recording layer containing columnar grains, and the case of φ=0° corresponds to a magnetic recording layer formed from a continuous magnetic film. From FIG. 22, the transition noise when φ is equal to or smaller than 75° is greatly smaller than that when φ is 90 to 80°. Particularly, the transition noise when φ is 70 to 45° is about $\frac{1}{10}$ that when φ is 90 to 80°. In this manner, evidently the transition noise could be greatly reduced in the magnetic recording layer containing the island-like grain in which the angle φ defined by its side surface and the substrate surface was 75° or less.

Example 3C

A glass disk substrate, an Si disk substrate (both had a diameter of 2.5 inch), a Co$_{76}$Pt$_{19}$Cr$_5$ target, and an Si$_3$N$_4$ target were set in an ion beam sputtering apparatus. The surface of the substrate was ion-etched. The ultimate vacuum degree immediately before the start of deposition was set at 6.7×10$^{-5}$ Pa, and the Ar pressure in deposition was set at 2.4×10$^{-2}$ Pa. A permanent magnet was set on the lower surface of the disk to apply a magnetic field in the tangential direction in rotating the disk about its axis. Under the conditions in which the acceleration voltage was 700 V and the beam current was 30 mA, alternate sputtering was performed to form a magnetic recording layer. At this time, an operation of performing sputtering using the Co$_{76}$Pt$_{19}$Cr$_5$ target for 75 sec, and performing sputtering using the Si$_3$N$_4$ target for 25 sec after a lapse of 10 sec was repeatedly executed to form a magnetic recording layer having a total thickness of 20 nm.

Figure 23:
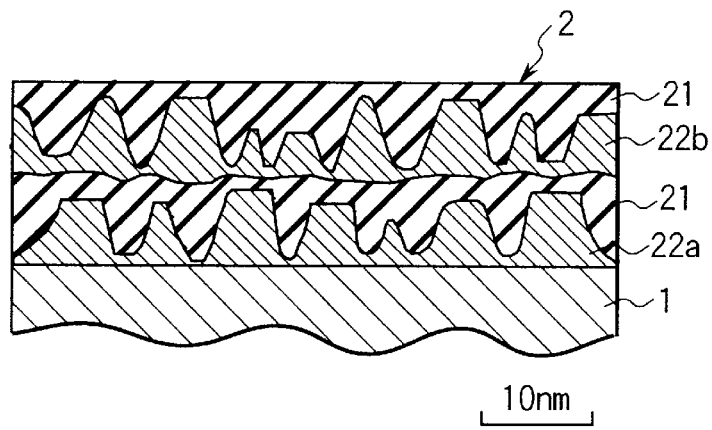
FIG. 23 is a view showing a TEM image of a section of a magnetic recording medium in Example 3C of the present invention.

FIG. 23 schematically shows a TEM image of a section of the magnetic recording layer formed on the glass disk. As shown in FIG. 23, a magnetic recording layer 2 is formed on a glass disk 1, and has a two-layered structure in which frustoconical magnetic grains 22a are dispersed in a nonmagnetic matrix 21 formed from Si$_3$N$_4$. In the frustoconical grain 22a present in each layer, the average size of the bottom surface was 7 nm, and the average height was 6 nm.

This magnetic recording layer had in-plane magnetic anisotropy, a coercive force of 176 kA/m (2.2 kOe), a saturation magnetization of 0.56 Wb/m$^2$ (448 G), and a magnetic coercive energy of 3.2×10$^6$ J/M$^3$.

A lubricant was applied on the magnetic recording layer formed on the Si substrate, and recording/reproduction was performed to measure the noise level. The noise level upon DC erasing was almost the same as that upon recording at a predetermined frequency, and the transition noise upon recording was nearly 0. The erase ratio obtained when overwrite recording was performed at 120 kfci after recording at a track density of 30 kfci was 42 dB; good overwrite characteristics were attained. When the magnetic recording layer upon recording was observed with the MFM, a sharp bit pattern free from any transition fluctuation between recording bits was confirmed.

Example 3D

A glass disk substrate, an Si disk substrate (both had a diameter of 2.5 inch), and Co, Fe, and Al targets were set in a sputtering apparatus. Ternary co-sputtering was performed in an Ar atmosphere containing 10%-oxygen to form a 10-nm thick magnetic recording layer.

When the fine structure of the magnetic recording layer was examined, the magnetic recording layer had a structure in which frustoconical CoFe grains and spheroidal CoFe grains flat along the in-plane direction were dispersed in an Al$_2$O$_3$ matrix. In the frustoconical grain, the average size of the bottom surface was about 11 nm, and the average height was about 7 nm. In the spheroidal grain, the average size in the in-plane direction was about 7 nm. The average spacing between the frustoconical grain and the spheroidal grain was about 1.7 nm. The volume fraction of the magnetic grains was 55%.

This magnetic recording layer had in-plane magnetic anisotropy, a coercive force of 181 kA/m (2.3 kOe), a saturation magnetization of 0.50 Wb/m² (405 G), and a magnetic anisotropy energy of $1.22 \times 10^6$ J/m³.

A lubricant was applied on the magnetic recording layer formed on the Si substrate, and recording/reproduction was performed to measure the noise level. The noise level upon DC erasing was almost the same as that upon recording at a predetermined frequency, and the transition noise upon recording was nearly 0. The erase ratio obtained when overwrite recording was performed at 120 kfci after recording at a track density of 30 kfci was 38 dB; good overwrite characteristics were attained. When the magnetic recording layer upon recording was observed with an MFM, a sharp bit pattern free from any transition fluctuation between recording bits was confirmed.

Example 3E

A glass disk substrate, an Si disk substrate (both had a diameter of 2.5 inch), and crucibles respectively containing V, $Co_{80}Pt_{20}$, and SiO as an evaporation source were set in an electron beam evaporation apparatus. First, V was deposited to 100 nm at an ultimate vacuum degree of $6 \times 10^{-6}$ Pa to form an underlayer. Next, $Co_{80}Pt_{20}$ and SiO were co-evaporated to form a 18-nm thick magnetic recording layer.

At this time, $Co_{80}Pt_{20}$ grains could be dispersed in an SiO matrix in various forms by changing the substrate temperature during deposition.

Of the obtained magnetic recording layers, a magnetic recording layer obtained under the condition of a substrate temperature of 100° C. exhibited the most excellent noise reduction characteristics, so the results of this magnetic recording layer will be first described.

When the fine structure of this magnetic recording layer was examined, the magnetic recording layer had a structure in which frustoconical $Co_{80}Pt_{20}$ grains were dispersed in the SiO matrix. In the frustoconical grain, the average size of the bottom surface was about 14 nm, and the average height was about 13 nm. The volume fraction of the $Co_{80}Pt_{20}$ grains was 60 vol %.

This magnetic recording layer had in-plane magnetic anisotropy, a coercive force of 141 kA/m (1.8 kOe), a saturation magnetization of 0.50 Wb/m² (398 G), and a magnetic anisotropy energy of $1.1 \times 10^6$ J/m³.

A lubricant was applied on the magnetic recording layer formed on the Si substrate, and recording/reproduction was performed to measure the noise level. The noise level upon DC erasing was almost the same as that upon recording at a predetermined frequency, and the transition noise upon recording was nearly 0. The erase ratio obtained when recording was performed at 80 kfci after recording at a track density of 20 kfci was 38 dB; good overwrite characteristics were attained. When the magnetic recording layer upon recording was observed with the MFM, a sharp bit pattern free from any transition fluctuation between recording bits was confirmed.

For comparison, the structure and recording/reproduction characteristics of a magnetic recording layer obtained under the conditions in which the substrate temperature was 200° C. were examined. This magnetic recording layer had a structure in which a continuous $Co_{80}Pt_{20}$ film was formed on an underlayer. This magnetic recording layer had a coercive force as large as 3 kOe, but also had very strong transition noise. Therefore, the magnetic recording layer formed from the continuous magnetic film is not suitable for a high-density magnetic recording medium.

Example 3F

A substrate on which a thermal oxide film was formed on the surface of a 2.5" Si disk, a Pt target, an $Sm_{17}Co_{83}$ target, and a BN target were set in a multi-target magnetron sputtering apparatus. A 50-nm thick Pt underlayer was formed on the substrate by using the Pt target. While the substrate bias was applied, the $Sm_{17}Co_{83}$ and BN targets were subjected to binary co-sputtering to form a 13-nm thick magnetic recording layer on the Pt underlayer.

When the fine structure of this magnetic recording layer was examined, frustoconical $Sm_{17}Co_{83}$ grains were dispersed in a BN matrix. In the frustoconical grain, the average size of the bottom surface was about 8 nm, and the size height was about 11 nm. The volume fraction of the $Sm_{17}Co_{83}$ grains with respect to the entire magnetic recording layer was 48 vol %.

This magnetic recording layer had a coercive force of 3.1 kOe. Such a large coercive force was obtained probably because the oxygen concentration decreased in the magnetic metal since BN as the nonmagnetic matrix had high reduction properties and was not contained in $Sm_{17}Co_{83}$ as a solid solution.

A lubricant was applied on the magnetic recording layer, and recording/reproduction was performed to measure the noise level. The noise level upon DC erasing was almost the same as that upon recording at a predetermined frequency, and the transition noise upon recording was nearly 0. The erase ratio obtained when overwrite recording was performed at 150 kfci after recording at a track density of 50 kfci was 39 dB; good overwrite characteristics were attained. When the magnetic recording layer upon recording was observed with an MFM, a sharp bit pattern free from any transition fluctuation between recording bits was confirmed.

Example 4

Example 4A

Binary co-sputtering was performed using a glass disk substrate, a CoPt target, and an $SiO_2$ target in an Ar atmosphere at 0.3 Pa to form a 50-nm thick magnetic recording layer. The distance (TS) between the targets and the substrate in sputtering was set at 200 mm or 50 mm.

This magnetic recording layer was constituted by CoPt grains and an Si—O matrix. The matrix had a composition of nearly $SiO_2$, and had a Vickers hardness of 2 GPa in bulk. When this magnetic recording layer was immersed in aqua regia to selectively dissolve only CoPt, only the matrix portion was left maintaining the shape of the original magnetic recording layer, and the matrix continuously existed in the perpendicular and in-plane directions of the magnetic recording layer.

A composition analysis was performed for these magnetic recording layers by using an analytical transmission electron microscope (analytical TEM). As a result, in the magnetic recording layer obtained under the condition of TS=50 mm, the Si content in the central region of the CoPt grain was 10 atomic % or less, and the O content in that region was 28 atomic % or less. In the magnetic recording layer obtained under the condition of TS=200 mm, the Si content in the central region of the CoPt grain was 5 atomic % or less, and the O content in that region was 10 atomic % or less. In either case, the Co and Pt contents in the central region of the Si—O matrix were 5 atomic % or less.

When the magnetic characteristics of these magnetic recording layers were measured, in-plane magnetic anisotropy was exhibited. The coercive force Hc and saturation magnetization Is of the magnetic recording layer obtained under the condition of each TS were as follows.

| TS | Hc | Is |
|---|---|---|
| 50 mm | ≈ 160 kA/m (2000 Oe) | ≈ 0.5 Wb/m² (400 G) |
| 200 mm | ≈ 80 kA/m (1000 Oe) | ≈ 0.6 Wb/m² (480 G) |

A sample fabricated under the condition of TS=50 mm was selected, and the following experiment was performed. The magnetic recording layer was observed with a TEM, and the volume packing ratio of the CoPt grains was calculated to be about 0.5 over the entire recording layer. The average volume of the CoPt grain was $4 \times 10^{-24}$ m³.

The average in-plane size of the CoPt grain measured from the surface of the magnetic recording layer was 6 to 9 nm. The average magnetic cluster size obtained when this sample was AC-demagnetized was about 100 nm. The shape magnetic anisotropy calculated from the average shape of the CoPt grain and the magnetization of the grain estimated from the whole magnetic characteristics was 2.1 to $3.2 \times 10^5$ J/m³. The magnetocrystalline anisotropy estimated from a magnetic torque measurement was $2 \times 10^6$ J/m³. The resistivity was measured by bringing a probe into contact with the surface of the magnetic recording layer to obtain about 10 Ω·cm.

Example 4B

A magnetic recording layer containing magnetic grains doped with boron was fabricated in the same manner as in Example 4A except for the use of a CoPt target doped with boron at 8 atomic %. The coercive force of the obtained magnetic recording layer increased to 220 kA/m. When the composition was analyzed using an analytical TEM, the average boron concentration in the nonmagnetic matrix was 1/50 or less that in the magnetic grains.

Example 4C

A magnetic recording layer containing a nonmagnetic matrix doped with Ta was fabricated in the same manner as in Example 4A except for the use of an Si—O target doped with Ta at 7 atomic %. The resistivity of the obtained magnetic recording layer decreased to about $10^{-2}$ Ω·cm. This is advantageous to decrease the probability of damage to the element by a leakage current from the MR head. When the composition was analyzed with an analytical TEM, the average Ta concentration in the magnetic grains was 1/10 or less that in the nonmagnetic matrix.

Example 4D

A magnetic recording layer having magnetic grains and a nonmagnetic matrix both doped with boron was fabricated in the same manner as in Example 4A except for the use of a CoPt target doped with boron at 5 atomic % and an Si—O target doped with boron at 10 atomic %. The coercive force increased to 220 kA/m by doping boron into the magnetic grains. The strain of the entire magnetic recording layer was reduced by doping boron into the nonmagnetic matrix. This is advantageous to improve the durability of the magnetic recording layer.

The noise level and durability of each of the magnetic recording layers in Examples 4A to 4D were examined. A lubricant was applied on the magnetic recording layer formed on a 2.5" glass disk, and recording/reproduction was performed to measure the noise level by using a spectrum analyzer. In any of magnetic recording layers, the noise level upon DC erasing was almost the same as that upon signal recording. The sliding characteristics between the head and the medium were evaluated by a contact-start-stop (CSS) test. Any of the magnetic recording layers could withstand 500,000 tests or more though no protective film was formed.

Example 4E

A 2.5" glass disk substrate, a Cr target, a $Co_{80}Pt_{20}$ target, and an $SiO_2$ target were set in a multi-target magnetron sputtering apparatus. The Cr target was first sputtered in an Ar atmosphere at 0.3 Pa to form a 60-nm thick Cr underlayer on the glass disk. While a substrate bias of 400 W was applied, the $Co_{80}Pt_{20}$ and $SiO_2$ targets were subjected to binary co-sputtering to form a 15-nm thick magnetic recording layer on the Cr underlayer.

Variations in size of CoPt grains in the perpendicular direction were reduced by bias sputtering. In the central region of the CoPt grain, the Si content was 10 atomic % or less and the O content was 35 atomic %. The Co content in the central region of the Si—O matrix was 5 atomic % or less. The crystal orientation of the CoPt grains was improved by the presence of the Cr underlayer. As a result, a large coercive force of 220 kA/m could be obtained though the thickness of the magnetic recording layer was as small as 15 nm. A coercivity squareness S* increased from 0.6 in Example 4A to 0.8.

A lubricant was applied on the magnetic recording layer formed on the glass disk, and recording/reproduction was performed to measure the noise level by using the spectrum analyzer. The noise level upon DC erasing was almost the same as that upon signal recording. The erase ratio increased to 50 dB though it was 40 dB in example 4A in which no Cr underlayer was formed. When the sliding characteristics between the head and the medium were evaluated by a CSS test, the magnetic recording layer could withstand 500,000 tests or more though no protective film was formed.

Example 4F

A magnetic recording layer made of CoPt grains and a TiN matrix was fabricated in the same manner as in Example 4A except for the use of a TiN target. The magnetic characteristics of this magnetic recording layer were almost the same as those in Example 4A. This magnetic recording layer was immersed in aqua regia to selectively dissolve only CoPt. Only the matrix portion was left maintaining the shape of the original magnetic recording layer, and the matrix continuously existed in the perpendicular and in-plane directions of the magnetic recording layer.

The disks in Examples 4A and 4F were loaded into a hard disk drive. The MR head was brought into contact with the disk of Example 4F in a still state, and the resistances between a plurality of portions in the head and the spindle were measured and converted into resistivities. In any of the measurements, a value of $5\times10^{-2}$ Ω·cm or more was obtained. Next, reproduction was performed with the MR head. Then, discharge was forcibly caused between the medium and the head by injecting electric charges from the head into the magnetic recording layer, and sometimes bringing the head into contact with the magnetic recording layer. In the disk of Example 4A, the probability of electrostatic destruction of the MR head was high. In the disk of Example 4F, the probability of electrostatic destruction of the MR head was reduced by half.

Example 4G

A magnetic recording layer made of CoPt grains and an InSnO (ITO) matrix was fabricated in the same manner as in Example 4A except that an InSnO target was used instead of the SiO₂ target, and Ar+10%-oxygen was used instead of the Ar atmosphere. The magnetic characteristics of this magnetic recording layer were almost the same as those in Example 4A.

The obtained disk was loaded into the hard disk drive, the head was brought into contact with the disk in a still state, and the resistances between a plurality of portions in the head and the spindle were converted into resistivities. In any of the measurements, a value of $10^{-3}$ Ω·cm or more was obtained. When a forcible discharge experiment was performed, the MR head was hardly damaged.

Example 5

Example 5A

Ternary co-sputtering was performed using a glass disk substrate, and Co, Fe, and Al targets in an Ar atmosphere containing 10%- or 30%-oxygen to form a 20-nm thick magnetic recording layer. The distance (TS) between the targets and the substrate in sputtering was set at 200 mm or 50 mm. This magnetic recording layer was formed from FeCo grains and a matrix having a composition of nearly $Al_2O_3$. In the bulk state, this matrix material had a Vickers hardness of 12 GPa. This magnetic recording layer was immersed in aqua regia to selectively dissolve only the FeCo grains. As a result, only the matrix portion was left maintaining the shape of the original magnetic recording layer, and the matrix continuously existed in the perpendicular and in-plane directions of the magnetic recording layer.

The composition of the fine region of the magnetic recording layer was analyzed using an analytical TEM. In each magnetic recording layer obtained under each of the conditions of TS and the $O_2$ partial pressure, the Al and O contents in the central regions of the FeCo grain were as follows.

| TS | $O_2$ | Al | O |
|---|---|---|---|
| 50 mm | 10% | < 10 at % | 32 at % |
| 50 mm | 30% | < 10 at % | 50 at % |
| 200 mm | 10% | < 5 at % | 10 at % |
| 200 mm | 30% | < 5 at % | 45 at % |

In any of the magnetic recording layers obtained under the respective conditions, the Co and Fe contents in the central region of the Al—O matrix were 5 atomic % or less.

When the magnetic characteristics of the magnetic recording layer were measured, in-plane magnetic anisotropy was exhibited. The coercive force Hc and saturation magnetization Is of each of the magnetic recording layers obtained under the respective conditions of TS and the $O_2$ partial pressure were as follows.

| TS | $O_2$ | Hc | Is |
|---|---|---|---|
| 50 mm | 10% | ≈ 160 kA/m | ≈ 1.0 Wb/m² |
| 50 mm | 30% | ≈ 60 kA/m | ≈ 0.5 Wb/m² |
| 200 mm | 10% | ≈ 100 kA/m | ≈ 1.0 Wb/m² |
| 200 mm | 30% | ≈ 60 kA/m | ≈ 0.7 Wb/m² |

A sample obtained under the conditions in which TS was 50 mm and the $O_2$ partial pressure was 10% was selected, and the following experiment was performed. The composition of the interface region between FeCo and Al—O was analyzed to find the presence of a very thin FeCo—O phase. This interface phase has a function of strengthening the connection between the FeCo grain and the Al—O matrix. Generation of this interface phase is advantageous to enhance the toughness of the magnetic recording layer and improve the durability.

The magnetic recording layer was observed with a TEM, and the volume packing of the FeCo grains was calculated to be about 0.65 over the entire recording layer. The average volume of the FeCo grain was $4\times10^{-24}$ m³. From the surface observation of the magnetic recording layer, the average in-plane size of the grain was 7 to 8 nm. The average magnetic cluster size obtained when this sample was AC-demagnetized was about 120 nm. The grain had a spheroidal shape, and the ratio of the major axis/minor axis was 2 to 5. The shape magnetic anisotropy was 5.4 to $8.2\times10^5$ J/m³. The magnetocrystalline anisotropy estimated from a magnetic torque measurement was $10^6$ J/m³. The resistivity was measured by bringing a probe into contact with the surface of the magnetic recording layer to obtain about 10 Ω·cm.

Example 5B

A 20-nm thick magnetic recording layer was formed in the same manner as in Example 5A except that a Cr target was used in addition to the three kinds of targets in Example 5A. This magnetic recording layer was constituted by FeCoCr grains and an Al—O matrix having a composition of nearly $Al_2O_3$. The coercive force Hc of the magnetic recording layer increased to about 180 kA/m. The composition of the interface region between FeCo and Al—O was analyzed to find the presence of a very thin FeCo—O phase and a Cr phase. These interface phases have a function of strengthening the connection between the FeCo grain and the Al—O matrix. Generation of these interface phases is advantageous to enhance the toughness of the magnetic recording layer and improve the durability.

Example 5C

A magnetic recording layer was formed by quaternary co-sputtering in the same manner as in Example 5B except that a magnetic field having an average strength of 40 kA/m was applied from a permanent magnet to a substrate in the perpendicular direction. The major axis of a grain in the obtained magnetic recording layer directed in a direction substantially perpendicular to the film surface, and a perpendicularly magnetized film was obtained.

The following experiment was performed for the magnetic recording layers in Examples 5A to 5C. A lubricant was applied on the magnetic recording layer formed on the glass disk, and recording/reproduction was performed to measure the noise level by using a spectrum analyzer. As a result, in any of the magnetic recording layers, the noise level upon DC erasing was almost the same as that upon signal recording. When the sliding characteristics between the head and the medium were evaluated by a CSS test, any of the magnetic recording layers could withstand 500,000 tests or more though no protective film was formed.

Even when Pt, Sm, Ni, and the like were used as a material constituting a magnetic grain, Zr, Ti, B, and the like were used as a material forming a nonmagnetic matrix, Ta, W, Hf, V, In, Si, B, and the like were used as an additive element to the magnetic grain, and nitrogen gas and an organic gas were used as a reactive gas, the same results as those in Examples 5A to 5C were obtained.

Example 6

Example 6A

A glass disk substrate, a CoZrNb target, and a mosaic target made of SmCo and carbon were set in a sputtering apparatus. The CoZrNb target was first sputtered in an Ar atmosphere to form an underlayer on the substrate. Then, the SmCo-carbon mosaic target was sputtered to form a 50-nm thick magnetic recording layer. At this time, the distance (TS) between the targets and the substrate was set at 200 mm or 50 mm. Thereafter, the magnetic recording layer was annealed at 400° C. for 2 hours.

The obtained magnetic recording layer was constituted by SmCo grains and a carbon matrix. As a result of a structural analysis, the matrix was found to be diamond-like carbon. When the magnetic recording layer was immersed in an acid to selectively dissolve only the SmCo grains, only the matrix and underlayer portions were left maintaining the shape of the original magnetic recording layer, and the matrix continuously existed in the perpendicular and in-plane directions of the magnetic recording layer.

The composition of the fine region of the magnetic recording layer was analyzed using an analytical TEM. In the magnetic recording layer obtained under the condition of TS=50 mm, the carbon content in the central region of the SmCo grain was 10 atomic %. In the magnetic recording layer obtained under the condition of TS=200 mm, the carbon content in the central region of the SmCo grain was 42 atomic %. In this manner, the results in which the relationship between Ts and the content of the matrix constituent element in the central region of the magnetic grain was reverse to those in Examples 4 and 5 were obtained. This can probably be attributed to diffusion of each element upon annealing. In either magnetic recording layer obtained under either condition, the Sm and Co contents in the central region of the carbon matrix were 10 atomic % or less.

When the magnetic characteristics of these magnetic recording layers were measured, perpendicular magnetic anisotropy was exhibited. The coercive force Hc and saturation magnetization Is of the magnetic recording layer obtained under the condition of each TS were as follows.

| TS | Hc | Is |
|---|---|---|
| 50 mm | ≈ 100 kA/m | ≈ 0.7 Wb/m² |
| 200 mm | ≈ 220 kA/m | ≈ 0.5 Wb/m² |

A sample obtained under the condition of TS=200 mm was selected, and the following experiment was performed. The magnetic recording layer was observed with a TEM, and the volume packing ratio of the SmCo grains was calculated to obtain about 0.5 over the entire magnetic recording layer. The average volume of the grain was $4 \times 10^{-25}$ m³. The average in-plane size of the grain obtained from the surface observation of the magnetic recording layer was 3 to 4 nm. The average magnetic cluster size obtained when this sample was AC-demagnetized was about 50 nm. The grain had a spheroidal shape, and the ratio of the major axis/minor axis was 2 to 5. The shape magnetic anisotropy was 1.7 to $2.6 \times 10^5$ J/m³. The magnetocrystalline anisotropy estimated from a magnetic torque measurement was $8 \times 10^6$ J/m³.

Example 6B

A 70-nm thick magnetic recording layer was formed in the same manner as in Example 6A except that an MnBi target was used instead of the SmCo target. This magnetic recording layer was constituted by MnBi grains and a carbon material. As a result of a structural analysis, the matrix was found to be diamond-like carbon.

When the magnetic characteristics of this magnetic recording layer were measured, perpendicular magnetic anisotropy was exhibited, the coercive force Hc was about 160 kA/m, and the saturation magnetization Is was about 1 Wb/m². The magnetic recording layer was observed with a TEM, and the volume packing ratio of the MnBi grains was calculated to uniformly obtain about 0.65 over the entire recording layer. The average volume of the grain was $4 \times 10^{-24}$ m³.

The noise level and durability of each of the magnetic recording layers in Examples 6A and 6B were examined. A lubricant was applied on the magnetic recording layer formed on a 2.5" glass disk, and recording/reproduction was performed to measure the noise level by using a spectrum analyzer. In either of the magnetic recording layers, the noise level upon DC erasing was almost the same as that upon signal recording. When a CSS test was run, either of the magnetic recording layers could withstand 500,000 tests or more though no protective film was formed.

Example 7

Example 7A

A glass disk substrate, and CoPt, CrTa, and Si targets were set in a sputtering apparatus. Ternary biased co-sputtering was performed in an Ar atmosphere containing 10%-nitrogen to form a magnetic recording layer on the substrate. At this time, the distance (TS) between the targets and the substrate was set at 200 mm and 50 mm.

The obtained magnetic recording layer was constituted by CoPtCrTa grains and an Si—N matrix. When the magnetic recording layer was immersed in aqua regia to selectively dissolve only CoPtCrTa, only the matrix portion was left maintaining the shape of the original magnetic recording layer, and the matrix continuously existed in the perpendicular and in-plane directions of the magnetic recording layer.

The composition of the fine region of the magnetic recording layer was analyzed using an analytical TEM. In the magnetic recording layer obtained under the condition of TS=50 mm, the Si content in the central region of the CoPtCrTa grain was 10 atomic % or less, and the N content in that region was 30 atomic %. In the magnetic recording layer obtained under the condition of TS=200 mm, the Si content in the central region of the CoPtCrTa grain was 5 atomic %, and the N content in that region was 10 atomic %. In either magnetic recording layer, the Co and Pt contents in the central region of the Si—N matrix were 5 atomic % or less.

When the magnetic characteristics of these magnetic recording layers were measured, in-plane magnetic anisotropy was exhibited. The coercive force Hc and saturation magnetization Is of the magnetic recording layer obtained under the condition of each TS were as follows.

| TS | Hc | Is |
|---|---|---|
| 50 mm | ≈ 200 kA/m | ≈ 0.8 Wb/m² |
| 200 mm | ≈ 80 kA/m | ≈ 0.8 Wb/m² |

A sample obtained under the condition of TS=50 mm was subjected to the following experiment. The composition of the interface region between CoPtCrTa and Si—N was analyzed to find the presence of a very thin Cr phase. This Cr phase has a function of strengthening the connection between the CoPtCrTa grain and the Si—N matrix. Generation of this interface phase is advantageous to enhance the toughness of the magnetic recording layer and improve the durability. In addition, the Cr interface phase has a function of modulating composition in the grain, and improving the magnetic characteristics, and particularly the coercive force.

The magnetic recording layer was observed with a TEM, and the volume packing ratio of the CoPtCrTa grains was calculated to uniformly obtain about 0.5 over the entire magnetic recording layer. The average volume of the grain was $10^{-24}$ m³. The average in-plane size of the grain obtained from the surface observation of the magnetic recording layer was 7 to 8 nm. The average magnetic cluster size obtained when this sample was AC-demagnetized was about 100 nm. The grain had a spheroidal shape, and the ratio of the major axis/minor axis was 2 to 5. The shape magnetic anisotropy was 3.4 to $5.1\times10^5$ J/m³. The magnetocrystalline anisotropy estimated from a magnetic torque measurement was $2\times10^6$ J/m³.

The magnetic recording medium was loaded into a hard disk drive, the head was brought into contact with the medium in a still state, and the resistances between a plurality of portions in the head and the spindle were measured and converted into resistivities. In any of the measurements, a value of about 10 Ω·cm or more was obtained. The coercive force of this magnetic recording layer was 200 kA/m. With the use of a recording head having a pole saturation magnetic flux density Bs of 0.4 T, the SNR was small, and high-density recording could not be performed. With the use of a recording head having Bs of 1 T, the noise reduced, and the SNR increased by 8 dB.

When the sectional structure of this magnetic recording layer was observed using a TEM, many voids having a radius of about 2 nm and a depth of about 3 nm were found in the surface. These voids have a size large enough to allow entrance of a lubricant molecule having a diameter of several Å and a length of several nm. Further, a larger number of larger voids can be formed in the surface of the recording layer because the magnetic grain and the nonmagnetic matrix wear out in different manners in vanishing before a lubricant application step.

On the other hand, hardly any voids like the one described above were found in the surface of a magnetic recording layer formed from a CoPtCrTa thin film which was fabricated for comparison. Since a thin metal film uniformly wears in the perpendicular direction in vanishing, voids for allowing the lubricant to enter cannot be formed.

A lubricant was applied on each of these magnetic recording layers, and the durability was examined by scanning the head in a contact state. As a result, the magnetic recording layer of Example 7A exhibited durability superior to that of the CoPtCrTa film. This is because the adhesion properties of the lubricant are improved in the magnetic recording layer of Example 7A.

Example 7B

A magnetic recording layer formed from CoPtCrTa grains and an Si—O—Si—N matrix was fabricated in the same manner as in Example 7A except that quarternary biased co-sputtering was performed in an Ar atmosphere containing 10%-nitrogen by using CoPt, CrTa, Si—O, and Si targets in order to improve the magnetic characteristics of the magnetic recording layer.

When the magnetic characteristics of this magnetic recording layer were measured, in-plane magnetic anisotropy was exhibited, the coercive force Hc was about 220 kA/m, and the saturation magnetization Is was 0.9 Wb/m². When the composition of the fine region of the magnetic recording layer was analyzed using an analytical TEM, the Si content was 3 atomic % or less, but the N content was 15 atomic %, and the O content was 25 atomic %, all in the central region of the CoPtCrTa grain. The Co and Pt contents in the central regions of the Si—O—Si—N matrix were 1 atomic % or less.

Example 8

Figure 24:
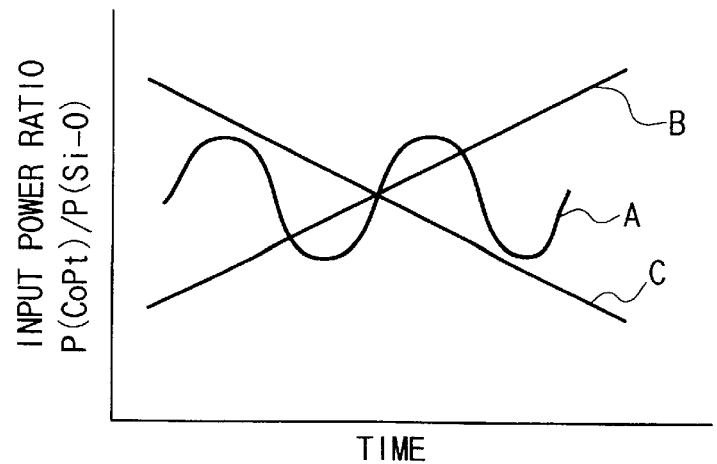
FIG. 24 is a view for explaining how to change the ratio of input power to a CoPt target and an $SiO_2$ target in forming a magnetic recording layer in Example 8 of the present invention.

In forming a magnetic recording layer similar to that in Example 4A, the ratio of input powers to CoPt and SiO$_2$ targets was changed by three kinds of methods as shown in FIG. 24. Method A periodically changes the input power ratio in a sinusoidal shape. Method B gradually increases the ratio of the input power to CoPt with respect to the input power to SiO$_2$. Method C gradually decreases the ratio of the input power to the CoPt with respect to the input power to SiO$_2$.

When a magnetic recording layer obtained by each method was immersed in aqua regia to selectively dissolve only CoPt, only the matrix portion was left maintaining the shape of the original magnetic recording layer, and the matrix continuously existed in the perpendicular and in-plane directions of the magnetic recording layer.

A section of the magnetic recording layer obtained by each method was observed with a TEM to examine changes in packing ratio of the grains in the perpendicular direction. In addition, the characteristics such as the adhesion properties of the magnetic recording layer were examined.

In a magnetic recording layer obtained by the method of changing the input power ratio, like method A, peeling hardly occurred in a peeling test using an adhesive tape. In a magnetic recording layer obtained by setting the input power ratio constant, peeling easily occurred. These results indicate that the internal stress of the magnetic recording layer is relaxed by method A.

In a magnetic recording layer obtained by a method of changing the input power ratio, like method B, the packing ratio of the CoPt grains increased toward the surface side of the magnetic recording layer. In this magnetic recording layer, no peeling occurred in a peeling test using an adhesive tape.

In a magnetic recording layer obtained by a method of changing the input power ratio, like method C, the packing ratio of the CoPt grains decreased toward the surface side of the magnetic recording layer. When the resistivity was measured by bringing a probe into contact with the surface of the magnetic recording layer, it was about 80% the resistivity of the magnetic recording layer obtained by setting the input power ratio constant.

The adhesion properties of the magnetic recording layer were improved by performing reverse sputtering before forming the magnetic recording layer on a glass disk. For example, even in the magnetic recording layer obtained by setting the input power ratio constant, the peeling ratio in the peeling test decreased, and the coercive force increased from 160 kA/m to 200 kA/m. These effects are attained because the surface roughness of the substrate changes upon irradiating Ar ions on the glass disk in sputter etching, and free oxygen on the surface of the substrate disappears. The same effects can be obtained by a surface modification method such as neutron irradiation or ion plating, in addition to sputter etching.

The noise level and durability of each of the magnetic recording layers formed by the three kinds of methods were examined. A lubricant was applied on the magnetic recording layer formed on a 2.5" glass disk, and recording/reproduction was performed to measure the noise level by using the spectrum analyzer. As a result, in any of the magnetic recording layers, the noise level upon DC erasing was almost the same as that upon signal recording. When the sliding characteristics between the head and the medium were evaluated by a CSS test, the magnetic recording layer could withstand 500,000 tests or more though no protective film was formed.

Example 9

Example 9A

A glass disk substrate, a $Co_{80}Pt_{20}$ target, and an $SiO_2$ target were set in a sputtering apparatus. While the glass disk was rotated about its axis, the $Co_{80}Pt_{20}$ and $SiO_2$ targets were RF-co-sputtered to form a 20-nm thick magnetic recording layer on the substrate. After this disk was immersed in dilute nitric acid for 30 sec, it was dried by blowing drying nitrogen.

Example 9B

A glass disk substrate, a $Co_{80}Pt_{20}$ target, and an $Si_3N_4$ target were set in a sputtering apparatus. While the glass disk was rotated about its axis, the $Co_{80}Pt_{20}$ and $Si_3N_4$ targets were RF-co-sputtered to form a 20-nm thick magnetic recording layer on the substrate. After this disk was immersed in a 5N hydrogen peroxide solution for 30 sec, it was dried by rotating it at a high speed.

Example 9C

An Si disk substrate, and a mosaic target formed from $Co_{75}Pt_{25}$ and $Al_2O_3$ were set in the sputtering apparatus. While the Si disk was set immediately above the target to oppose it, and kept still, the target was RF-sputtered to form a 20-nm thick magnetic recording layer on the substrate. After the surface of this disk was cleaned with a neutral detergent, the disk was dried by blowing ozone gas.

Comparative Example 9D

A glass disk substrate, a $Co_{80}Pt_{20}$ target, an $SiO_2$ target, and a carbon target were set in a sputtering apparatus. While the glass disk was rotated about its axis, the $Co_{80}Pt_{20}$ and $SiO_2$ targets were RF-co-sputtered to form a 20-nm thick magnetic recording layer on the substrate. Then, the carbon target was DC-sputtered to form a 10-nm thick protective film on the substrate. The surface of this disk was cleaned with a neutral detergent.

Comparative Example 9E

A glass disk substrate, a $Co_{80}Pt_{20}$ target, and an $SiO_2$ target were set in a sputtering apparatus. While the glass disk was rotated about its axis, the $Co_{80}Pt_{20}$ and $SiO_2$ targets were RF-co-sputtered to form a 20-nm thick magnetic recording layer on the substrate. The surface of this disk was cleaned with a neutral detergent.

Comparative Example 9F

A glass disk substrate, a $Co_{80}Pt_{20}$ target, and an $SiO_2$ target were set in a sputtering apparatus. While the glass disk was rotated about its axis, the $Co_{80}Pt_{20}$ and $SiO_2$ targets were RF-co-sputtered to form a 20-nm thick magnetic recording layer on the substrate. After the surface of this disk was cleaned with a neutral detergent, a heat treatment was performed in a nitrogen atmosphere at 200° C. for 30 min.

The OH concentration on the surface of each of the obtained magnetic recording layers was measured with an X-ray electron spectrophotometer (XPS). More specifically, the number of O—H bonds from the surface to a portion about 2 nm deep was counted to calculate the number of O—H bonds per unit area.

After a lubricant was applied on each magnetic recording layer, the disk was loaded into a hard disk drive. A head capable of operating with a flying height of 10 nm or more was used. While the flying height of the head was gradually decreased, the head was moved over the entire range of the radius of the disk. When an AE sensor confirmed a collision, the height of any projection was measured. The magnetostatic characteristics were examined by the VSM. Recording/reproduction was performed using a thin film head to examine the S/Nm ratio of the medium at a recording density exhibiting a recording resolution $D_{70}$. The results of these tests are shown in Table 3.

TABLE 3

| | OH Concentration [atm/cm$^2$] | Height of Projection [nm] | Hc [kOe] | Mrt [menu/cm$^2$] | S* | S/Nm [dB] |
|---|---|---|---|---|---|---|
| 9A | 5.8 × 10$^{13}$ | 10 | 2.3 | 0.73 | 0.7 | 45 |
| 9B | 3.6 × 10$^{13}$ | 10 | 2.1 | 0.87 | 0.7 | 43 |
| 9C | 4.8 × 10$^{13}$ | 10 | 2.1 | 0.80 | 0.6 | 44 |
| 9D | 9.0 × 10$^{13}$ | 15 | 2.1 | 0.85 | 0.6 | 26 |
| 9E | 6.0 × 10$^{14}$ | 1000 | 2.1 | 0.83 | 0.7 | 20 |
| 9F | 6.2 × 10$^{13}$ | 10 | 1.5 | 0.52 | 0.5 | 19 |

The height of the projection was 10 nm or less in Examples 9A to 9C and Comparative Example 9F, about 15 nm in Comparative Example 9D, and about 1 μm in Comparative Example 9E. In Comparative Example 9E, it is surmised that, since the OH concentration on the surface was high, the lubricant could not be uniformly applied to generate high projections. In Comparative Example 9F, since a heat treatment was performed to remove the OH groups, the magnetostatic characteristics deteriorated to decrease the S/Nm ratio. In Comparative Example 9D, the spacing between the head and the medium was large due to the presence of the carbon protective film to decrease the S/Nm ratio. To the contrary, in Examples 9A to 9C, since the OH groups on the surface of the magnetic recording layer were decreased by an acid or ozone treatment without performing a heat treatment, good magnetostatic characteristic and a high S/Nm ratio were obtained. In Comparative Example 9E, when the slider surface of the head was observed upon measurement, contamination with the lubricant was found. In the remaining samples, no contamination was found on the slider surface of the head.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic recording apparatus comprising:
    a magnetic recording medium comprising a substrate and a magnetic recording layer formed on the substrate and having a structure in which magnetic grains are dispersed in a nonmagnetic matrix;
    means for recording magnetic information on the magnetic recording medium; and
    means for reproducing magnetic information from the magnetic recording medium,
    wherein a thickness of said magnetic recording layer is not more than 40 nm, and an average size of said magnetic grains is not more than 10 nm,
    wherein said magnetic grains are separated from said substrate by a part of said matrix and form a substantially single layer parallel to the main surface of the substrate, and
    wherein upper portions of said magnetic grains are exposed on a surface of said magnetic recording layer.

2. The apparatus according to claim 1, wherein said magnetic grains have a larger average size in a perpendicular direction than that in a in-plane direction.

3. The apparatus according to claim 1, wherein one of displacement of said magnetic grains in a perpendicular direction, and a level difference between lower ends of said magnetic grains is not more than 4 nm.

4. The apparatus according to claim 1, wherein said magnetic grains consist of an alloy containing a metal selected from the group consisting of Co, Pt, Sm, Fe, Ni, Cr, Mn, Bi, and Al.

5. The apparatus according to claim 1, wherein said nonmagnetic matrix consists of a material represented by the general formula M—G where M is at least one material selected from the group consisting of Si, Al, Zr, Ti, Ta, In, Sn, Ge, and B, and G is at least one material selected from the group consisting of oxygen, nitrogen, and carbon.

6. The apparatus according to claim 1, wherein said nonmagnetic matrix consists of a material selected from a group consisting of carbon, boron and germanium.

7. The apparatus according to claim 1, wherein a content of a magnetic element in a central region of said nonmagnetic matrix between said magnetic grains is not more than 20 atomic %.

8. The apparatus according to claim 1, wherein a concentration of OH groups on a surface of said magnetic recording layer is not more than $4 \times 10^{14}$ atm/cm$^2$.

9. The apparatus according to claim 1, wherein said reproducing means includes a magnetoresistive element.

10. A magnetic recording apparatus comprising:
    a magnetic recording medium comprising a substrate and a magnetic recording layer formed on the substrate and having a structure in which a plurality of magnetic grains are distributed in a thickness direction of a nonmagnetic matrix;
    means for recording magnetic information on the magnetic recording medium; and
    means for reproducing magnetic information from the magnetic recording medium,
    wherein said magnetic grains have a flat shape along a film surface, and an exchange interaction between adjacent magnetic grains in an in-plane direction is smaller than that in a perpendicular direction.

11. The apparatus according to claim 10, wherein a spacing between adjacent magnetic grains is less than 2 nm in the perpendicular direction, and 2 to 15 nm in the in-plane direction.

12. The apparatus according to claim 10, wherein a ratio of lengths of minor and major axes of each magnetic grain is 0.3 to 0.9.

13. The apparatus according to claim 12, wherein the ratio of the lengths of the minor and major axes of said magnetic grain is 0.3 to 0.5.

14. A magnetic recording apparatus comprising:
    a magnetic recording medium comprising a substrate and a magnetic recording layer formed on the substrate and having a structure in which magnetic grains are dispersed in a nonmagnetic matrix;
    means for recording magnetic information on the magnetic recording medium; and
    means for reproducing magnetic information from the magnetic recording medium,
    wherein said magnetic grains include conical or frustoconical magnetic grains, and an average value of angles defined by side surfaces of said conical or frustoconical magnetic grains and a surface of said substrate is not more than 75°.

15. The apparatus according to claim 14, wherein the angle defined by said side surface of each conical or frustoconical magnetic grain and the surface of said substrate is 30° to 70°.

16. The apparatus according to claim 14, wherein the conical or frustoconical magnetic grains grow in contact with an underlayer formed on said substrate.

17. The apparatus according to claim 16, wherein said underlayer consists of a material selected from the group consisting of Cr, V, Ti, Pt, Pd, Ir, and ZnO.

18. The apparatus according to claim 14, wherein magnetic grains constituting said magnetic recording layer includes said conical or frustoconical magnetic grains, and in addition flat magnetic grains separated from said conical or frustoconical magnetic grains by said nonmagnetic matrix.

19. The apparatus according to claim 18, wherein said flat magnetic grains have a size of 5 to 10 nm in an in-plane direction.

20. The apparatus according to claim 10, wherein said magnetic grains are separated from said substrate by a part of said matrix.

21. The apparatus according to claim 1, wherein said magnetic recording medium has electrical resistivity of $10^{-4}$ to $10^5$ Ω·cm.

22. The apparatus according to claim 10, wherein said magnetic recording medium has electrical resistivity of $10^{-4}$ to $10^5$ Ω·cm.

23. The apparatus according claim 14, wherein said magnetic recording medium has electrical resistivity of $10^{-4}$ to $10^5$ Ω·cm.

* * * * *

UNITED STATES PATENT AND TRADEMARK OFFICE
CERTIFICATE OF CORRECTION

PATENT NO. : 6,174,597 B1
DATED : January 16, 2001
INVENTOR(S) : Keiichiro Yusu et al.

It is certified that error appears in the above-identified patent and that said Letters Patent is hereby corrected as shown below:

Column 35,
Line 41, "in a in-plane" should read -- in an in-plane --.

Column 36,
Line 63, after "according", insert -- to --.

Signed and Sealed this

Twenty-first Day of May, 2002

Attest:

JAMES E. ROGAN
*Attesting Officer*     *Director of the United States Patent and Trademark Office*